US008300908B2

(12) United States Patent
Schneider et al.

(10) Patent No.: US 8,300,908 B2
(45) Date of Patent: Oct. 30, 2012

(54) DEVICE AND METHOD FOR THE COMPUTER-ASSISTED ANALYSIS OF MAMMOGRAMS

(75) Inventors: Wilfried Schneider, München (DE); Peter Heinlein, München (DE); Marco Blumenthal, Jena (DE)

(73) Assignee: Image Diagnost International GmbH (DE)

( * ) Notice: Subject to any disclaimer, the term of this patent is extended or adjusted under 35 U.S.C. 154(b) by 888 days.

(21) Appl. No.: 12/298,891

(22) PCT Filed: Apr. 27, 2007

(86) PCT No.: PCT/EP2007/004030
§ 371 (c)(1),
(2), (4) Date: Jan. 29, 2009

(87) PCT Pub. No.: WO2007/124960
PCT Pub. Date: Nov. 8, 2007

(65) Prior Publication Data
US 2009/0220139 A1 Sep. 3, 2009

(30) Foreign Application Priority Data

Apr. 28, 2006 (DE) .......................... 10 2006 021 036

(51) Int. Cl.
*G06K 9/00* (2006.01)
(52) U.S. Cl. ......... 382/128; 382/294; 382/299; 382/218
(58) Field of Classification Search .................. 382/128, 382/218, 294, 299
See application file for complete search history.

(56) References Cited

U.S. PATENT DOCUMENTS

| 2002/0090124 A1 | 7/2002 | Soubelet |
| 2005/0171430 A1 | 8/2005 | Zhang et al. |
| 2006/0002633 A1 | 1/2006 | Takeo |

FOREIGN PATENT DOCUMENTS

| DE | 102006021012 | 10/2007 |
| EP | 0493855 | 7/1992 |

OTHER PUBLICATIONS

Anant Madabhushi, et al., Combining Low-, High-Level and Empirical Domain Knowledge for Automated Segmentation of Ultrasonic Breast Lesions. IEEE Transaction on Medical Imaging, vol. 22, No. 2, Feb. 2003.
SCAR 2005 Presentations-Digital Form, website pp. 1-3, http://www.siim2009.org/scar2005/presentations_digitalforum.htm.
SCAR 2005 Digital Breast Imaging Forum List Agenda, Moderators, Speakers, and Panel Participants, Jun. 4, 2005.
SCAR 2005 Digital Breast Imaging Forum, Transcription, Jun. 4, 2005 pp. 1-111.

(Continued)

*Primary Examiner* — Long Pham
(74) *Attorney, Agent, or Firm* — Global Patent Operation

(57) ABSTRACT

A device for the computer-assisted analysis of mammograms. Said device comprises means for detecting a contour line that surrounds an object area of the mammogram, which is defined by an object. The device also comprises a means for positioning and scaling the mammogram. The device is configured to determine the contour line of the object area of the mammogram and to automatically position and scale the mammogram based on the contour line. A method for the computer-assisted analysis of mammograms is also disclosed. The disclosed device and method make it easier for a doctor to comparatively analyze and diagnose mammograms.

15 Claims, 20 Drawing Sheets

OTHER PUBLICATIONS

David Clunie, "Interoperability, Transfer between Enterprises, Archival, Compression and Disaster Recovery", SCAR 2005 Annual Meeting.

Bradley M. Hemminger, "Softcopy Display Requirements for Digital Mammography", Journal of Digital Imaging, vol. 16, No. 3, Springer, New York, Dec. 2003, pp. 292-305.

Bernd Jahne, "Digitale Bildverarbeitung", Springer-Verlag Berlin, 1997, pp. 482-491.

J. T. Neyhart et al., "Dynamic Segmentation of Breast Tissue in Digitized Mammograms", Proceeding of 23rd Annual EMBS International Conference, Oct. 25-28, 2001, Istanbul, Turkey, Band 3, pp. 2669-2672.

David Raba et al., "Breast Segmentation with Pectoral Muscle Supression on Digital Mammograms", Pattern Recognition and Image Analysis, Springer, Berlin 2005, LNCS 3523, pp. 471-478.

Nora Szekely et al., "Detecting Lesions in a Mammogram", Proceedings of EC-VIP-MC, 2003, 4th EURASIP Conference on Video/Image Processing and Multimedia Communications, ISBN:953-184-054-7, pp. 113-118.

DICOM, "Supplemental 50: Mammography Computer-Aided Detection SR SOP Class", DICOM Standards Committee of Rosslyn, Virginia US, May 18, 2001, pp. 1-132.

DICOM, "Supplement 79: Breast Imaging Report Templates", DICOM Standards Committee of Rosslyn, Virginia US, Jan. 12, 2004, pp. 1-55.

Web site Publication, "Digital Mammography Screening", Image Diagnost International GmbH, pp. 1-3 http://www.imagediagnost de/screening.de.html, Jan. 2008.

"Screening-Losung fur die Mammographie", Deutsches Arzteblatt, Jahrgang 101, Heft 46, Nov. 12, 2004, pp. A3123.

DEVICE AND METHOD FOR THE COMPUTER-ASSISTED ANALYSIS OF MAMMOGRAMS

CROSS-REFERENCE TO RELATED APPLICATIONS

This application claims priority under 35 U.S.C. §119(a)-(d) to prior-filed, co-pending PCT patent application serial number EP2007/004030, filed on 27 Apr. 2007, which claims priority to earlier filed German Patent Application serial number 2006021036.0, filed on 28 Apr. 2006, each of which is hereby incorporated by reference in its entirety.

BACKGROUND

1. Field of the Invention

The field of the invention relates to a device for the computer-assisted analysis of mammograms and to a method for the computer-assisted analysis of mammograms. Such devices are designed to process a mammogram for the computer-assisted analysis, in order to aid the doctor in the diagnosis and evaluation of the mammogram, and for this purpose exhibit a means for the detection of a contour line, which surrounds an object area of the mammogram defined by an object. The mammogram to be processed is available to the device in digital form, in which the mammogram, depending on the X-ray machine used, can be taken and subsequently digitalized or taken in a direct-digital manner. Such devices can be used in this connection particularly for mammogram-screening, with which in the course of the screening examinations the mammae of the patient are, for example, photographed and examined for the early diagnosis of breast cancer.

2. Description of Related Art

In the course of the mammogram examinations, mammograms of the left and right mamma of a patient are taken and comparatively evaluated by a doctor. In the course of such mammogram examinations a series of mammograms are thereby generated, which are then—in each case for the left and right mamma—compared with one another. With the diagnosis a symmetry comparison between left and right mamma of a patient thereby plays an essential role, since the architecture disturbances in the form of asymmetries between left and right mamma can produce an indication for a possible tumor existing in one mamma.

With such mammogram examinations the problem is posed for a doctor, that the pictured mammae occupy for the most part only a sub-area of the mammogram, whereas the better part of the mammogram is filled out by the background area containing no information. This is crucial, since frequently small disturbances of the mamma are not hereby discernible for the doctor, based exclusively on the representation of the mamma in the mammogram. Moreover, as a rule the mammograms are displaced against each other and must thus be positioned relative to one another, in order to be able to be meaningfully compared with one another.

A need exists for a device and a method that make it easier for a doctor to comparatively analyze and diagnose mammograms.

SUMMARY OF THE INVENTION

This need is addressed in an embodiment of the invention by a device having means for detecting a contour line, which surrounds an object area of a mammogram defined by an object. The device further includes means for positioning and scaling of the mammogram. The device is configured to determine the contour line of the object area of the mammogram and to automatically position and scale the mammogram by means of the contour line.

In an embodiment, this need is also addressed by a computer-implemented method of analyzing one or more mammograms. The method includes determining a contour line, which divides an object area defined by an object from a background area of a mammogram, and automatically positioning and scaling the mammogram by means of the contour line, to position of the mammogram relative to another mammogram and to reduce the mammogram's background area relative to the object area.

Embodiments of the invention emanate from the knowledge, that the diagnosis can be made substantially easier for a doctor by a single or a number of mammograms generated in the course of a mammogram examination, if the mammograms are adjusted in their position and scaling and oriented to each other, so that for one thing they are immediately comparable on examination by a doctor and for the other the object area picturing the mamma is optimally represented. At the same time, it is provided according the claimed invention, that using a detected contour line the mammogram to be examined is positioned and scaled so that the mammogram is oriented relative to another mammogram and is scaled so that the background area depicted in the mammogram is automatically minimized in its surface vis à vis the object area, so that with the complete and unchanged image of the object area the background area occupies as little surface as possible in the mammogram and thus the mammogram is filled out in the optimal fashion by the object area.

In particular, in this connection different mammograms with contour lines determined from the mammograms can be oriented in their position relative to each other by the positioning. For example, it is thus conceivable, that in the course of a mammogram examination mammograms taken of the left and right mamma are positioned to each other so that a comparative diagnosis of the mammograms is made immediately possible for a doctor.

For the positioning of the mammogram, the image focal point of the mammogram can be determined, in which the mammograms are positioned relative to each other on the basis of contour lines pointing in each case through the image focal point. In this fashion, the mammograms can be displaced vertically against each other, so that their image focal points in each case are depicted at the same elevation.

For the scaling of the mammogram a rectangle surrounding the object area is determined advantageously, in order to scale the mammogram by means of the rectangle. At the same time, it is conceivable and advantageous in particular, if a rectangle surrounding the object area is determined for each mammogram and a uniform scaling factor to be applied to the mammograms for the scaling is determined from the different rectangles. In this manner, it is guaranteed that all mammograms are scaled uniformly and the proportions between the mammograms are thus preserved. The scaling factor is hereby determined, so that the mammogram with the largest rectangle is scaled in the optimal manner, so that the object area surrounded by the rectangle fills out the mammogram in the best possible manner.

For the detection of the contour line, a method can be used advantageously, so that depending on the image characteristic, thus, for example, depending on the bit-depth, photo type, the manufacturer and the image noise, of the respective mammogram to be processed, a threshold method, with which at least one threshold is used for the binarization of the mammogram, and/or a scan line method, with which the gradient of the mammogram is determined along different scan lines, is used for the detection of a contour line of the mammogram surrounding an object area. The knowledge which underlies this is, that with mammograms differing strongly in respect to the image characteristic, a uniform method for the detection of an object area is not sufficient, but rather, depending on the image characteristic, different methods have to be used, in order to reliably detect a contour line surrounding an object area of a mammogram. Therefore, a means is provided, by means of which different methods can be applied alternatively or in combination to a mammogram, in order to determine the contour line surrounding the object area of the mammogram in a reliable and robust manner. The proposed method for the detection of the contour line offers an advantage, that mammograms differing in their image characteristic, which can vary particularly with regard to the bit-depth, the dynamic range, gray-scale value distribution and the noise, for example, depending on the manufacturer of the X-ray machine used and the photo-modality, can be processed, in which—independent of the type of mammogram—a uniform output occurs in the form of a contour line delineating the object area or of a masking image generated by means of a contour line.

In principle, at the same time, depending on the type of the mammogram either a threshold method or a scan line method is used. It is also conceivable in this connection, to provide different variants of the method for different types of mammograms, for example, while direct-digital mammograms and CR-mammograms (CR: Computed Radiography) as well as mammograms with highly noisy background are processed with different threshold methods, with mammograms with a distinctive, distributed gray-scale value progression in the background, a scan line method is used, which does without a global threshold.

In particular, it is here conceivable and advantageous, that which method is used for the detection of the contour line of the mammogram is automatically selected on the basis of a mammogram to be processed. In the context of the method, the image is then automatically examined with regard to its image characteristic and, based on the image characteristic, the method to be used is selected.

After the contour line of the object area, therefore, for example, the contour line surrounding a mamma, has been determined, the object area in the form of a masking image, which is determined by means of the contour line, and/or in the form of the contour line, can be displayed and outputted. The essential advantage here is that for different mammograms, differing in regard to their image characteristic, a uniform output in the form of a masking image or a contour line is produced, thus, independent of the type of the mammogram, a uniform output is provided.

In an advantageous embodiment of the method, an edge treatment for the determination of the lateral boundary lines of the mammogram is implemented before the detection of the contour line. In the edge areas of a mammogram, artifacts in the form of bright strips or markers placed in the mammogram for the marking of the mammogram can be present, which disturb the detection of the contour line and can lead to false results with the detection of the contour line. In the context of the edge treatment, therefore, if needed, disturbing objects are ascertained and cropped in the edge areas of the mammogram, in order to eliminate from the outset possible sources of error during the detection of the contour line.

With the edge treatment, scan lines are thereby advantageously arranged perpendicular to an outer edge of the mammogram, the mammogram is read out along these scan lines, in each case the position of the steepest gradient of the mammogram is determined along the scan lines, and from the positions of this steepest gradient the lateral boundary line of the mammogram is determined. If the lateral boundary lines for all four outer edges of the mammogram have been determined, then the areas of the mammogram located outside of the boundary lines are cropped, the mammogram thus reduced and the disturbing object located in the edge areas of the mammogram removed.

In another design of the method, a contour reworking for the smoothing and correction of the contour line can be implemented after the detection of the contour line. If needed, this can be required, if the detected contour line is incomplete or defective, for example, when the mamma to be pictured is not completely displayed in the mammogram. Furthermore, by means of the contour reworking, objects, for example, the musculus pectoralis, can be separated from the object area to be pictured, for example, from the mamma, so that the contour line exclusively surrounds the object area, but not other objects located outside of the object area.

The contour reworking occurs advantageously, in that the detected contour line is divided into contour segments, the contour segments are smoothed, missing contour segments replenished and defective contour segments removed. In the process, the replenishment of missing contour segments occurs in that the contour line between two detected contour segments is interpolated, in order to close the contour line. The removal of defective contour segments occurs, in that objects not belonging to the desired object area are cropped, while the contour line of the object area is extrapolated.

As explained above, different methods are used for the detection of the contour line of the mammogram describing the object area, in order to provide a uniform interface for the reliable and robust detection of the contour line for different mammograms. In principle, both threshold methods as well as scan line methods are used in this connection, in which the suitable method is selected depending on the image characteristic of the respective mammogram to be processed. In this connection, there is a basic distinction between threshold methods, which employ at least one global threshold for the detection of the contour line of the mammogram, and scan line methods, which do without a global threshold.

Thereby, the basic course in the case of the threshold method is that a histogram of the mammogram is assessed, at least one threshold is determined from the histogram, the mammogram is binarized on the basis of the at least one threshold and a contour line is determined from the binarized mammogram. In this connection, by binarization it is to be understood, that the value 1 is assigned to the pixels of a mammogram, whose gray scale value lies above the threshold, the value 0 is assigned to the pixels, whose gray scale values lie under the threshold, in order to divide the mammogram in this way into the object area, in which all pixels with the value 1 are combined, and into the background area with all remaining pixels. The contour line is then determined by tracing the edge of the object area.

Depending on the mammograms to be processed, different variants of such a threshold method can be used. In a first variant of the threshold method, the histogram for the determination of the at least one threshold will run in ascending order based on the lowest gray scale value, a local maximum of the histogram is determined, the steepest gradient of the trailing edge of the histogram is sought according to the local maximum, a threshold is determined on the basis of the steepest gradient, and the threshold is used for the binarization of the mammogram. Such a threshold method, which analyzes the histogram of the mammogram from the bottom up, beginning with the lowest gray scale value of the mammogram, is particularly suitable for the processing of mammograms with highly noisy background, for example, with subsequently digitalized mammograms (film scan-modalities). With such mammograms the exact position of the contour line cannot be precisely established and also can be evaluated visually only with difficulty. For the separation of background area and object area the threshold is then located in the trailing edge of the first histogram hill, which represents the noise, and by means of this threshold binarizes the mammogram. It is conceivable in this connection subsequently to smooth the resulting contour line by means of morphological algorithms (closing, opening).

In an alternative variant of the threshold method, the histogram is run through in ascending order based on the highest gray scale value, a local maximum of the histogram is determined, a minimum of the histogram subsequent to the local maximum is sought and a threshold is determined on the basis of the minimum. These steps are repeated until the histogram is completely run through and thus a threshold has been determined for every local maximum, which has a subsequent minimum. In this manner, a series of different thresholds are determined, which are employed respectively for the binarization of the mammogram and for the determination of different contour lines. From the different contour lines thus determined the smoothest contour line is then selected and outputted as the contour line of the object area. Such a threshold method is particularly applicable for the detection of the contour line with direct-digital mammograms or with CR-mammograms.

On the other hand, for mammograms with a distinctive gray-scale value progression in the background area of the mammogram a threshold method is not readily applicable. Therefore, for such mammograms the scan line method is preferably used, which does without a global threshold for the detection of the contour line. With the scan line method, radial scan lines are mounted and the mammogram read out along the scan line based on a mounting point of the mammogram, which is preferably located in a central area of the mammogram, for example in the image focal point of the mammogram.

Based on the gray scale values of the mammogram along the scan lines a contour point for every respective scan line is then determined, in which the contour point corresponds to the location of the maximal gradient along the scan line considered. Through connection of the thus determined contour points of the individual scan lines the contour line is then produced and outputted.

Both with the different variants of the threshold method or with the scan line method it can be advantageously provided, to filter the mammogram by means of an average value filter operating locally on a group of pixels of the mammogram before the actual detection of the contour line. Such average value filters serve to form an average value locally in an area of the mammogram, for example, for a group of 3×3 or 7×7 pixels and thus to smear over and smooth the gray-scale value distribution of the mammogram, so that high-frequency noise components are suppressed and removed from the mammogram.

In a further design of the method, based on the determined contour line of the object displayed by the mammogram in the case of an interactive input of a finding by a doctor into the mammogram, the coordinates of the input can be determined and be transformed into a desired output format. Basically, in this manner it should be made possible for a doctor to input a finding directly in the indicated mammogram, through the analysis of the mammogram to automatically process, display and save the information contained in the finding. In particular, it is in this connection advantageous, if the coordinates of the input of the doctor are transformed into a time-of-day model, by means of which the position of the finding in the mamma can be indicated and displayed in an explicit and clearly laid out manner.

BRIEF DESCRIPTION OF THE DRAWINGS

One or more principles underlying the claimed invention shall subsequently be explained in more detail based on the execution example depicted in the following Figures.

FIG. 13b shows optimally positioned mammograms according FIG. 13 a.

FIG. 13c shows optimally positioned and scaled mammograms according to FIG. 13 a.

DETAILED DESCRIPTION OF THE INVENTION

In the course of mammogram examinations, mammograms of the left and right mamma of a patient are taken and evaluated by a doctor. In this connection, frequently in the course of a mammogram examination four mammograms are generated, in which a craniocaudal (CC) and a mediolateral oblique (MLO) photo is generated of each mamma of a patient respectively. The photos thus obtained are respectively compared with one another in pairs, in which the craniocaudal photos of the right and left mamma as well as the mediolateral oblique photos of the right and left mamma are subjected to a symmetry comparison. This symmetry comparison between left and right mamma of a patient plays an essential role in the diagnosis, since architecture disturbances in the form of asymmetries between left and right mamma can depict an indication of a possible tumor present in one mamma.

With such mammogram examinations the problem posed for a doctor, is that the pictured mammae occupy for the most part only a sub-area of the mammogram, whereas the better part of the mammogram is filled out by the background area containing no information. Moreover, the mammograms are as a rule displaced against each other and must thus be positioned relative to one another, in order to be able to be meaningfully compared with one another.

Figure 13A:
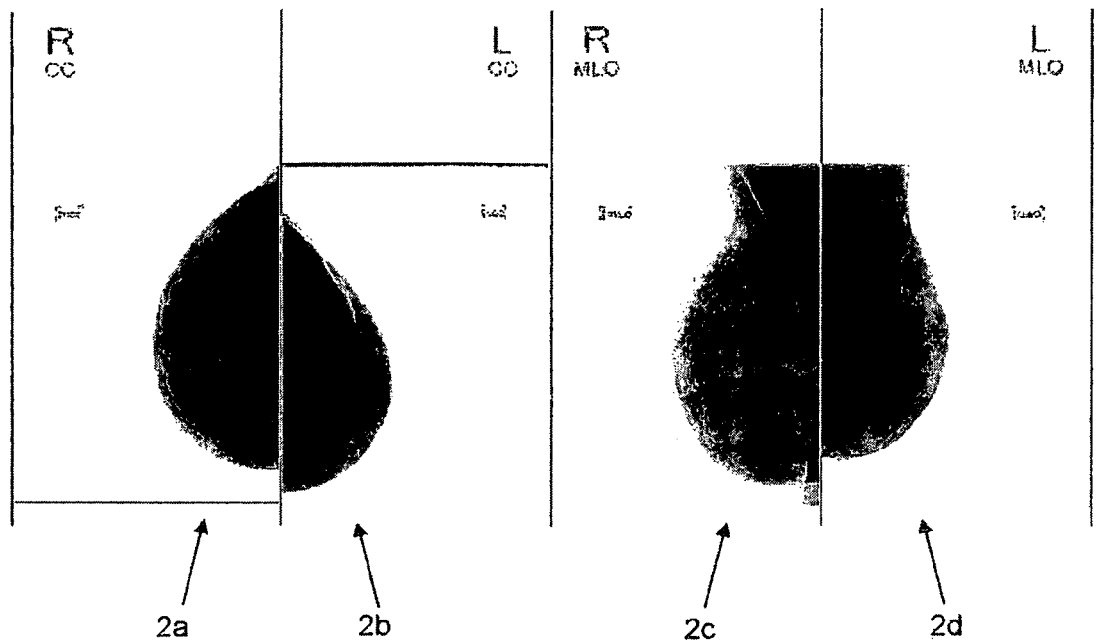
FIG. 13a shows mammograms of a right and left mamma in craniocaudal and mediolateral oblique view.
Figure 13B:
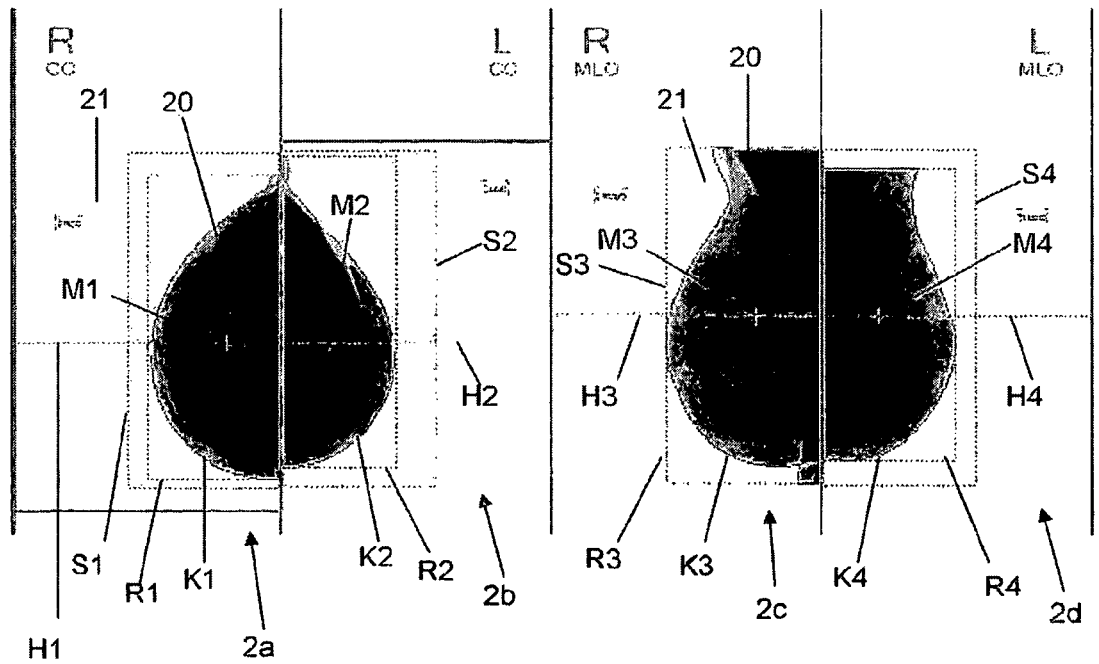
Figure 13C:
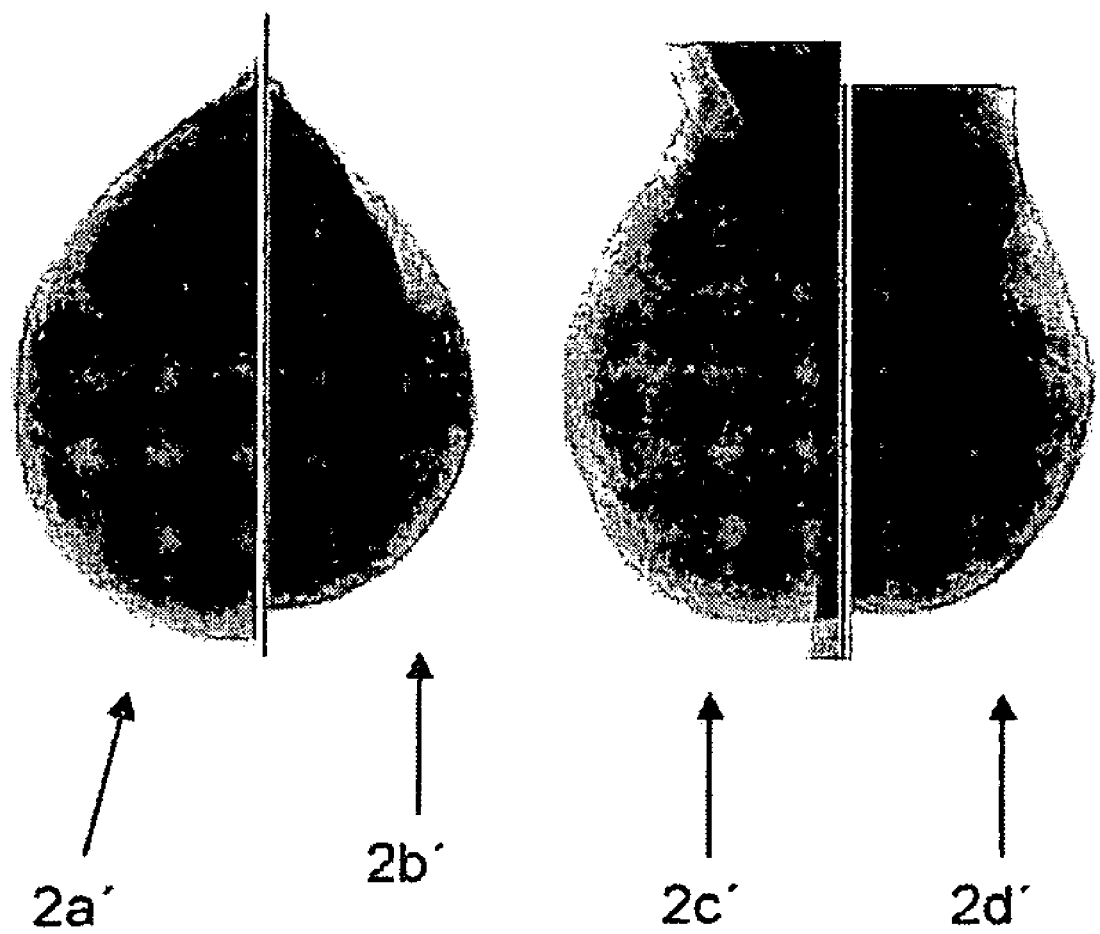

Exemplary mammograms 2a, 2b, 2c, 2d of such a mammogram examination are depicted in FIG. 13a-13c, in which the craniocaudal (CC) photos of the right (R) and left (L) mamma as well as mediolateral oblique (ML) photos of the right (R) and left (L) mamma are clearly visibly displaced vertically against each other. At the same time, the mammae occupying the object area 20 respectively fill out only a small part of the mammogram 2a, 2b, 2c, 2d, whereas the better part of mammogram 2a, 2b, 2c, 2d is occupied by a background area 21.

In order to optimally position and scale the mammograms 2a, 2b, 2c, 2d of such a mammography, initially a contour line K1, K2, K3, K4 is respectively determined, which divides the mamma depicted in the object area 20 from the background area 21 of the mammogram. A method is required for this, which implements the detection of these contour lines K1, K2, K3, K4 in a reliable manner. Such a method is described in detail later on the basis of FIG. 1 to 12.

After the contour line for each mammogram 2a, 2b, 2c, 2d is determined, for each mammogram 2a, 2b, 2c, 2d, the image focal point M1, M2, M3, M4 is determined and in each case the contour line H, H2, H3, H4, which points through the image focal point M1, M2, M3, M4, is determined. By means of the contour lines H1, H2, H3, H4 the mammograms 2a, 2b, 2c, 2d are then arranged in pairs vertical to each other for the craniocaudal (CC) and mediolateral oblique (MLO) photos.

Subsequently, a surrounding rectangle R1, R2, R3, R4 is determined by means of the contour lines K1, K2, K3, K4 for each mammogram 2a, 2b, 2c, 2d, in which with the determination of the surrounding rectangle R1, R2, R3, R4 the vertical arrangement is considered based on the contour lines H1, H2, H3, H4. Now the largest rectangle is selected of the surrounding rectangles R1, R2, R3, R4 and by means of this rectangle—the rectangle R3 in the case depicted in FIG. 13b—an optimal scaling factor is determined, by means of which all mammograms 2a, 2b, 2c, 2d are uniformly scaled. The scaling factor is thereby so determined, that the mamma surrounded by the largest rectangle R3 optimally fills out the mammogram 2a, 2b, 2c, 2d with the minimization of the background area and thus is displayed enhanced for the diagnosis.

In this connection, a uniform scaling factor is used in all directions, so that in each case the aspect ratio of the mammogram is not changed. In the case depicted in FIG. 13b, the scaling factor is then selected so that the mamma depicted in mammogram 2c is maximally enhanced in the horizontal direction and thus extends across the entire display area, corresponding to the area S3.

The mammograms 2a, 2b, 2c, 2d are then outputted exclusively in the areas S1, S2, S3, S4 according to FIG. 13b, so that the optimally scaled and positioned mammograms 2a', 2b', 2c', 2d' ensue according to FIG. 13c.

The essential advantage of the automatic positioning and scaling of the mammograms 2a, 2b, 2c, 2d with a mammogram examination is, that a manual adjustment of the mammograms 2a, 2b, 2c, 2d by a doctor is no longer required, so that the diagnosis and the evaluation of the mammogram 2a, 2b, 2c, 2d are thus made substantially easier for the doctor.

As indicated above, an essential requirement for the positioning and scaling of the mammograms 2a, 2b, 2c, 2d is the provision of a means for the reliable detection of the contour lines K1, K2, K3, K4 contained in a mammogram 2a, 2b, 2c, 2d. Such a method and a device shall be explained below. At the same time, the essential advantage of the device and the method described below is that different mammograms differing with regard to their image characteristic can be processed. In this connection, by image characteristic the characteristic nature of the mammogram is understood, which, for example, can be defined by the bit-depth, the dynamic range, the gray-scale value distribution of the mammogram and the noise contained in the mammogram and can be highly different depending on the type of photo-modality used and the manufacturer of the X-ray machine. The basic problem with such mammograms is, that mammograms differing with regard to image characteristic cannot be readily processed in general, in order to detect and to segment a mamma depicted in a mammogram in a reliable manner for different types of mammograms. In particular, in this connection the background areas of the mammograms vary greatly with regard to their gray-scale value distribution and structure—particularly depending on the manufacturer of the X-ray machine—and, in addition, markers contained in the image or bright edges along the outer edges of the mammogram disturb the detection of the contour line.

Figure 3A:
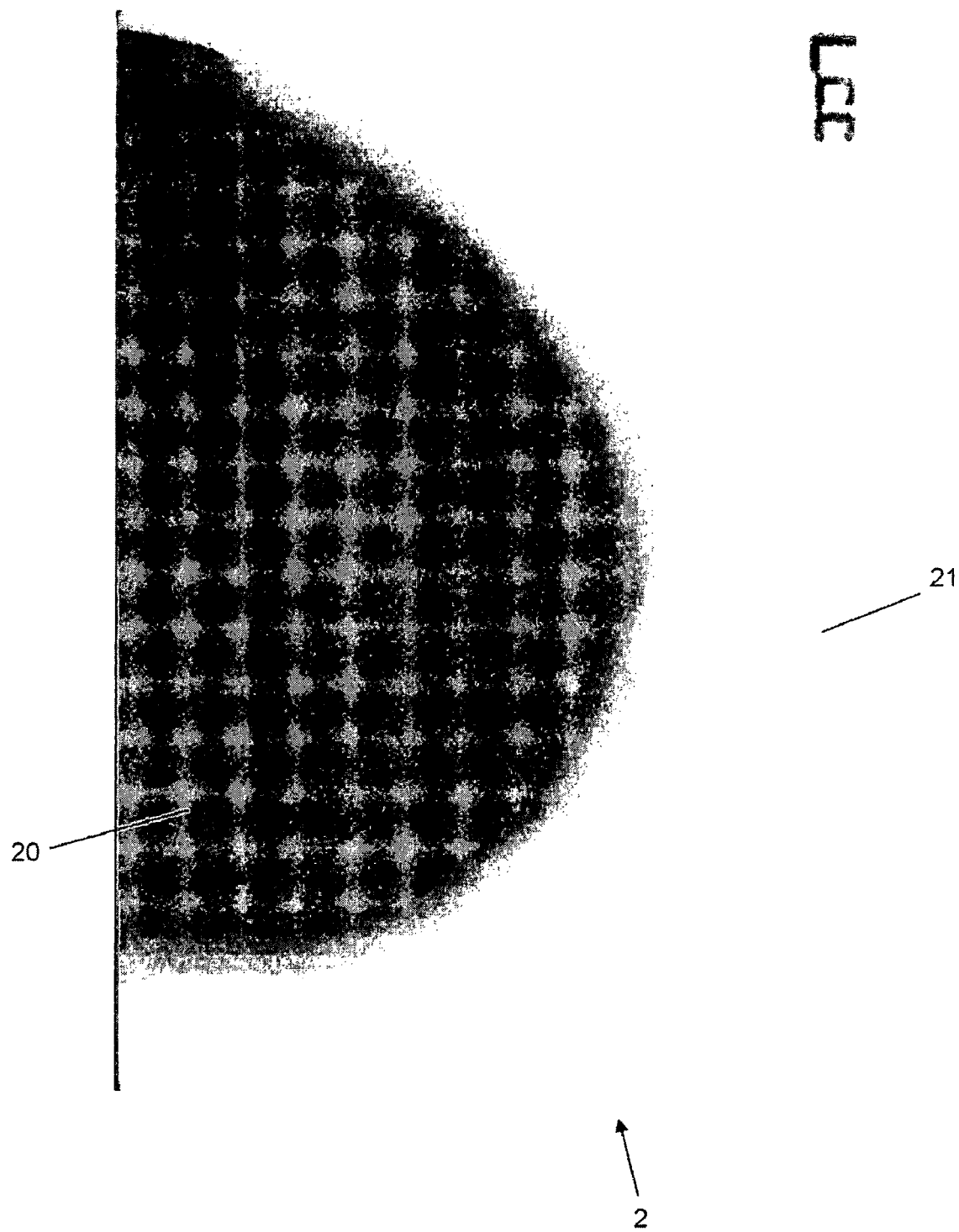
FIG. 3A, 3b shows a mammogram and a related histogram, indicating the grayscale value distribution of the mammogram and generated in the context of the threshold method according to FIG. 2.
Figure 5A:
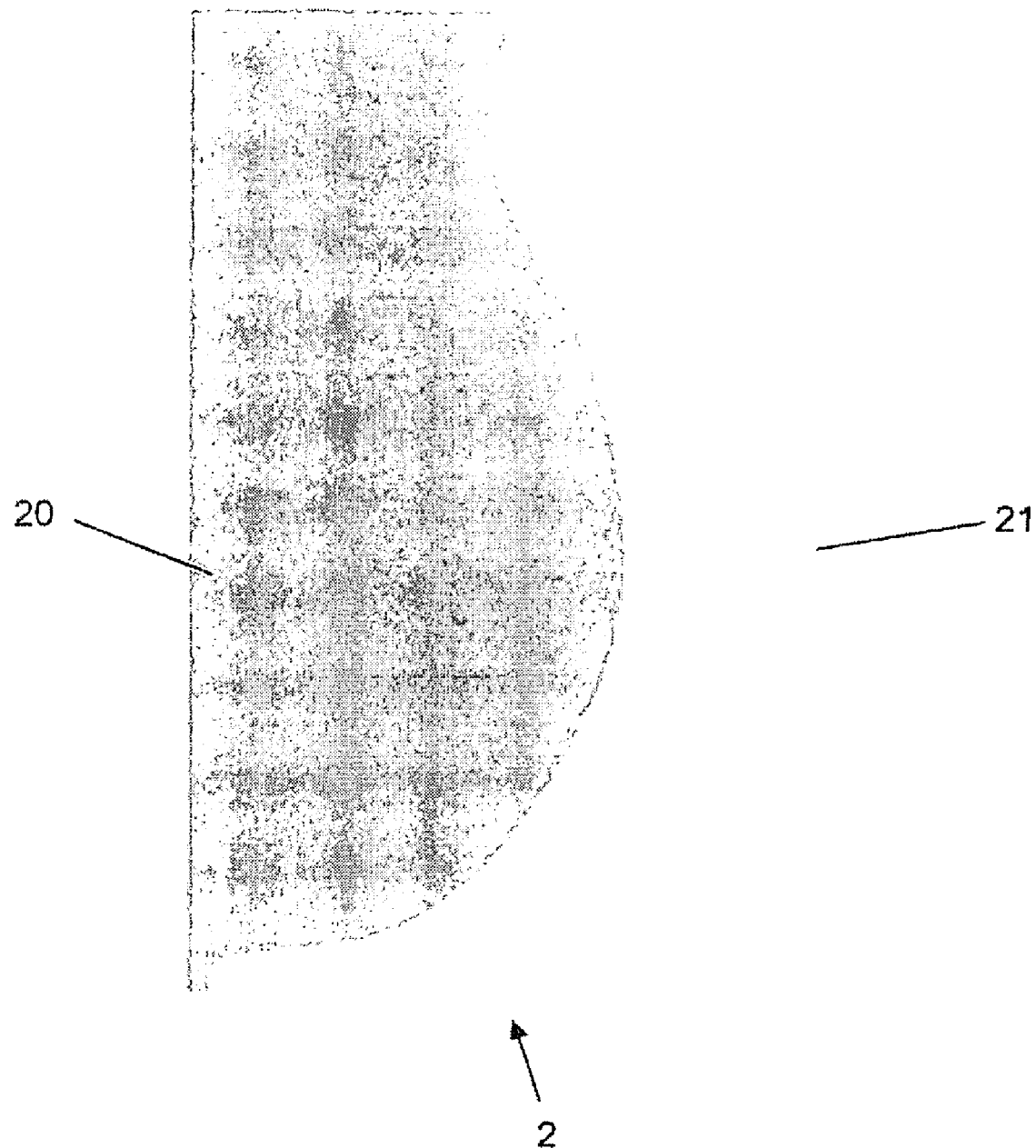
FIG. 5a-5d shows a mammogram and histograms derived from the mammogram in the context of the threshold method according to FIG. 4.
Figure 7A:
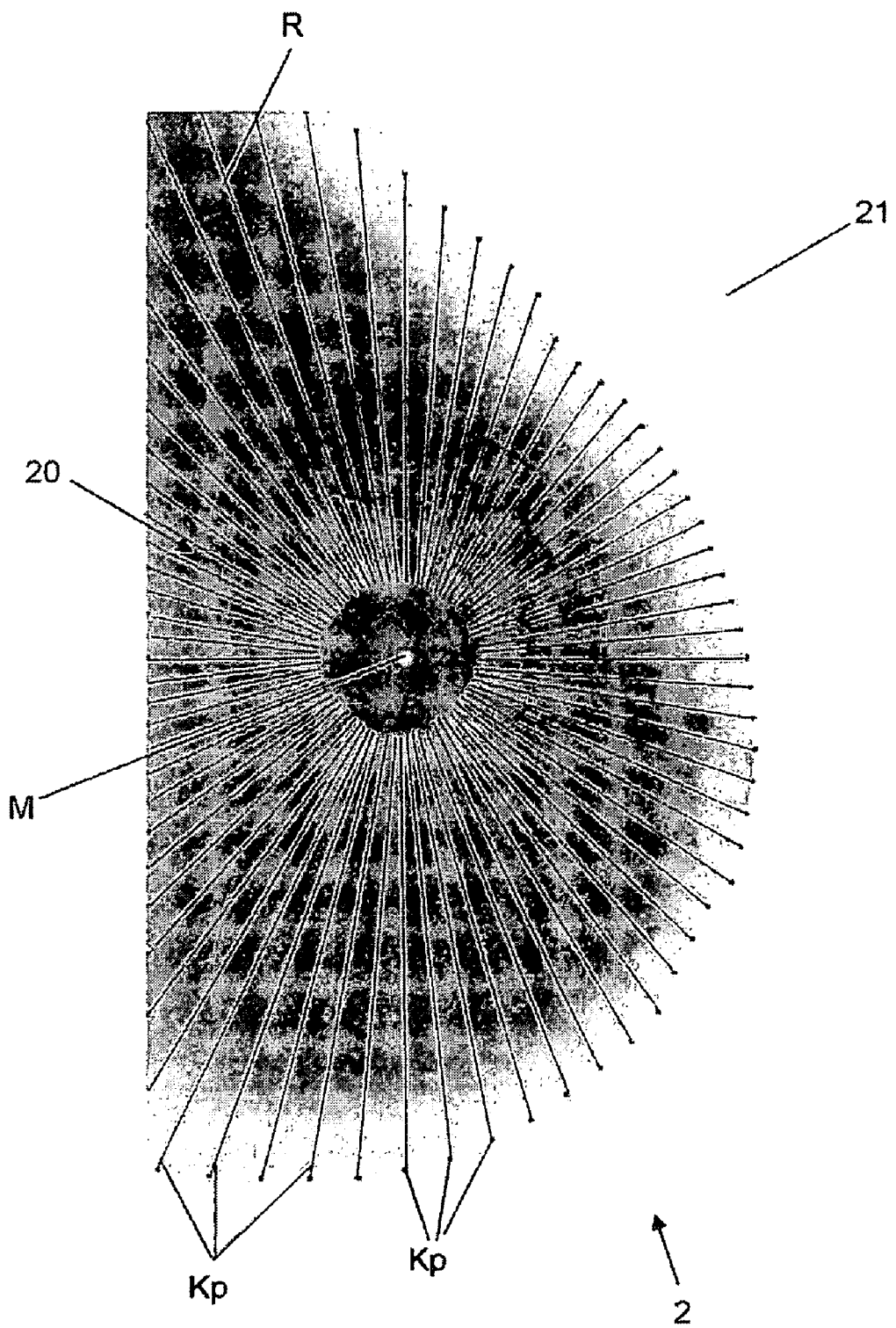
FIG. 7a shows a mammogram with scan lines mounted in the mammogram for the detection of the contour line.

Exemplary mammograms, which strongly differ from one another with regard to their gray-scale value distribution, their dynamic range and their noise, are depicted in FIGS. 3a, 5a and 7a. Hereby, in an object area 20, the mammograms 2 picture in each case a mamma set apart from a background area 21, in which the depiction of the mamma varies greatly from mammogram 2 to mammogram 2 with regard to the contrast between object area 20 and background area 21, the detectability of the contour line of the mamma and the structure in the mamma. A mammogram is depicted in FIG. 13a, so that it has been taken analogically and subsequently digitalized and for this reason has a weak contrast between object area 20 and background area 21 and a relatively high noise. In FIG. 5a, a mammogram taken direct-digitally is depicted, which is distinguished by a high contrast and low noise. In FIG. 5a, on the other hand, a mammogram taken analogically and subsequently digitalized is shown, which has a distinctive gray-scale value progression both in the object area 20 as well as in the background area 21. A problem thus consists in providing a uniform interface for the acquisition of the contour line between object area 20 and background area 21 for all types of mammograms.

By means of the device 1a means is provided which permits the processing of the most diverse mammograms 2. In this connection, the knowledge is utilized, that mammograms 2 differing with regard to their image characteristic cannot be processed with a uniform method for the detection of a contour line surrounding an object, but rather different methods are required for a reliable and robust detection of the contour line. At the same time, the device 1 is designed so that the appropriate method is selected depending on the image characteristic of the respective mammogram 2 to be processed and is used for the detection of the contour line. The device 1 thus provides an interface, by means of which the most diverse mammograms 2 are processed and a uniform output in the form of the contour line and/or the masking image determined from the contour line is provided for all mammograms 2.

Figure 1:
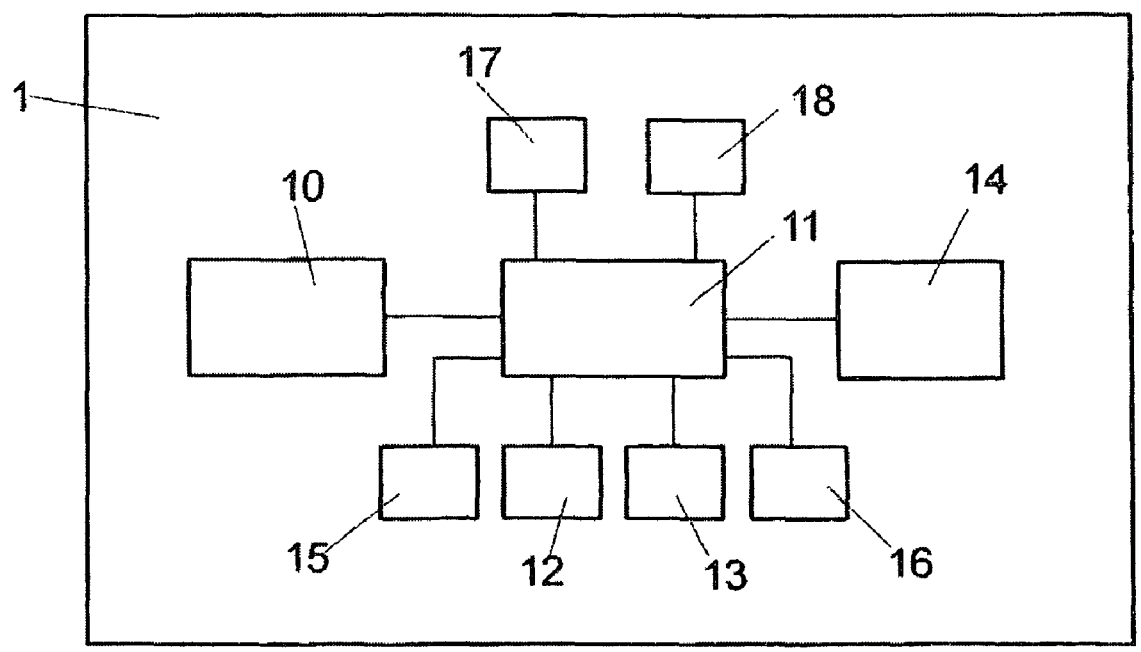
FIG. 1 shows a schematic diagram of a device for the computer-assisted analysis of mammograms differing in regard to the image characteristic.

The device 1 for the computer-assisted analysis has an input unit according to FIG. 1, by means of which a digital mammogram 2 is inputted into the device 1. The mammogram 2 can have been generated in this connection, for example, by means of a direct-digital photo method or subsequently digitalized with the use of analog X-ray equipment. The mammogram 2 is then transmitted to a processing unit 11, which has a means 13 for the implementation of a scan line method, a means 15 for the implementation of an edge treatment, a means 16 for the implementation of a contour reworking, a means 17 for the scaling and positioning of the mammogram 2, and an evaluation input device 18 for the input of a finding. The processing unit 11 serves in this connection for the processing of the mammogram, while the contour line of the object area 20 of the object displayed in the mammogram 2, particularly of the mamma, is determined and outputted. The device 1, moreover, has an output unit 14, via which an operator can scan the object area 20 of the mammogram 2 in the form of the contour line or a masking image determined from the contour line.

The device 1 can be designed, in particular, as a workstation, which receives a mammogram 2 to be processed from an X-ray machine, processes, outputs and displays the mammogram 2, via the output unit 14, for example, a monitor. In this connection, the means 12, 13, 15, 16, 17, 18 do not necessarily represent separate structural units, but rather can be implemented in regard to software in the workstation and thus can be realized by the workstation. The separate depiction of the means 12, 13, 15, 16, 17, 18 according to FIG. 1 serves in this connection merely for clarity. For example, through the conventional input devices of the workstation, particularly a keyboard and a mouse, the evaluation input device 18 can be realized, by means of which a doctor prepares a finding and inputs it into the workstation.

Depending on the type of mammogram 2 to be processed, a threshold method or a scan line method is used. In particular, three different types of mammograms can be distinguished in this connection, for which in each case different methods are used for the detection of the contour line.

For mammograms 2 with noisy background, particularly for mammograms, which have been taken in an analog manner and subsequently have been digitalized, a first threshold method is used.

With mammograms, which have been recorded in the direct-digital manner or by means of CR-modalities, a second threshold method is used. These mammograms 2 are characterized in that the background area as a rule has a very low gray scale value and a low noise.

For mammograms 2 with a distinctive gray-scale value progression in the background a scan line method is used, which does without a global threshold.

Depending on the type of the mammogram 2, the respectively appropriate method for the detection of the contour line is then used. The selection of the respective method to be used can thereby occur automatically within the device 1, in which the image characteristic of a mammogram 2 to be examined is analyzed, for example, by means of a histogram derived from the mammogram 2, which indicates the gray-scale value distribution of the mammogram 2.

The individual methods for the detection of the contour line of a mammogram 2 are subsequently described in detail.

Figure 2:
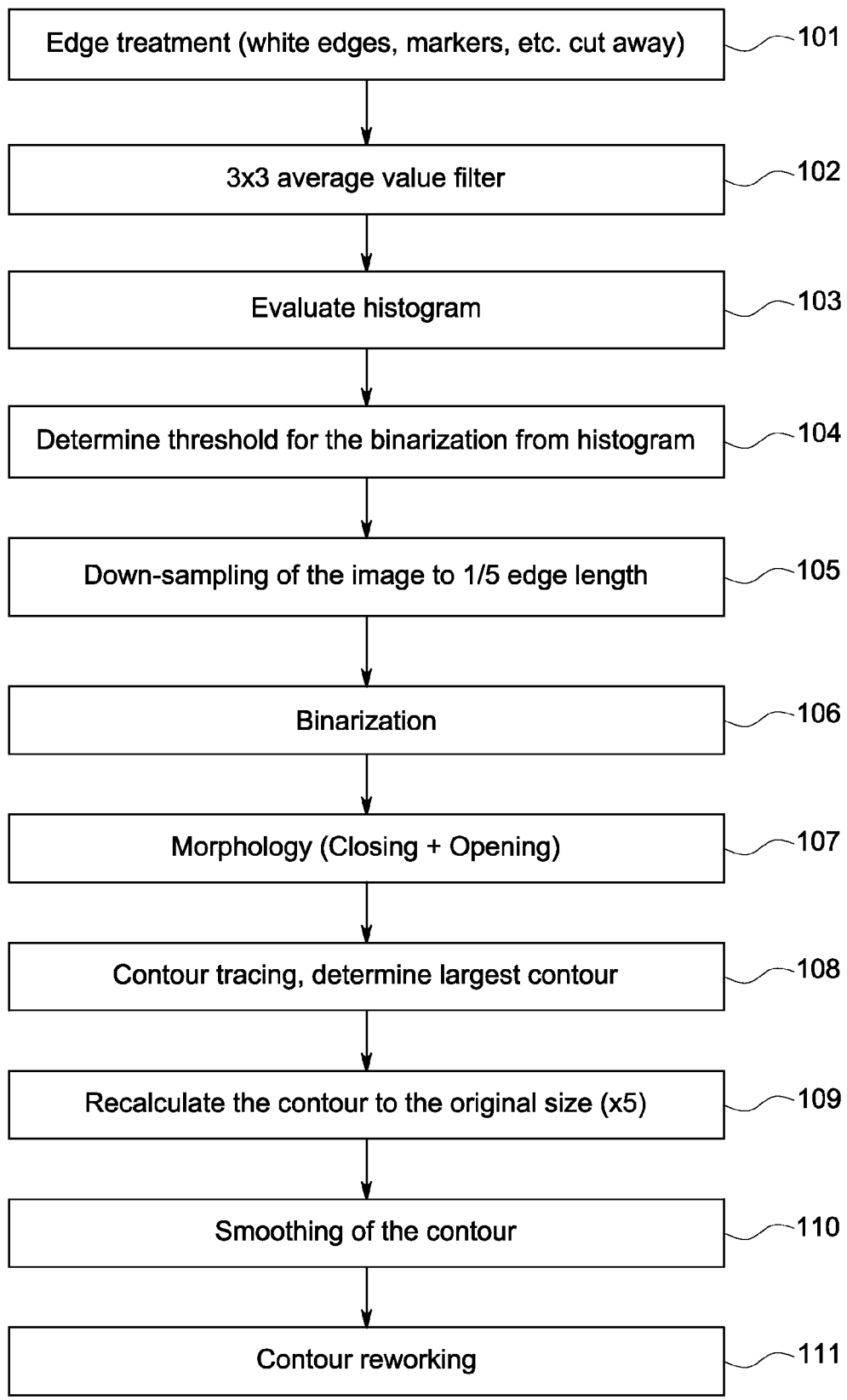
FIG. 2 shows a schematic diagram of an initial threshold method for the detection of a contour line of the mammogram.

In FIG. 2, the course of the first threshold method for images with noisy background is schematically depicted. Moreover, for explanation FIG. 3*a* shows an exemplary mammogram to be processed with the method according to FIG. 2. At first, with the method according to FIG. 2 in step 101 the mammogram 2 is subjected to an edge treatment, in which context bright edge strips and markers or suchlike in the edge area of the mammogram 2 are cropped (the method for the implementation of the edge treatment is explained in detail below). Subsequently, the mammogram 2 is low-pass filtered by means of an average value filter in step 102. In this connection, a filter can be used as an average value filter, which smears over the gray scale value of the pixel of the mammogram 2 across an area of for example 3×3 pixels, while the average value of the pixel is formed across this area, the average value filter is applied on the entire mammogram 2 and the mammogram 2 is thus low-pass filtered.

Figure 3B:
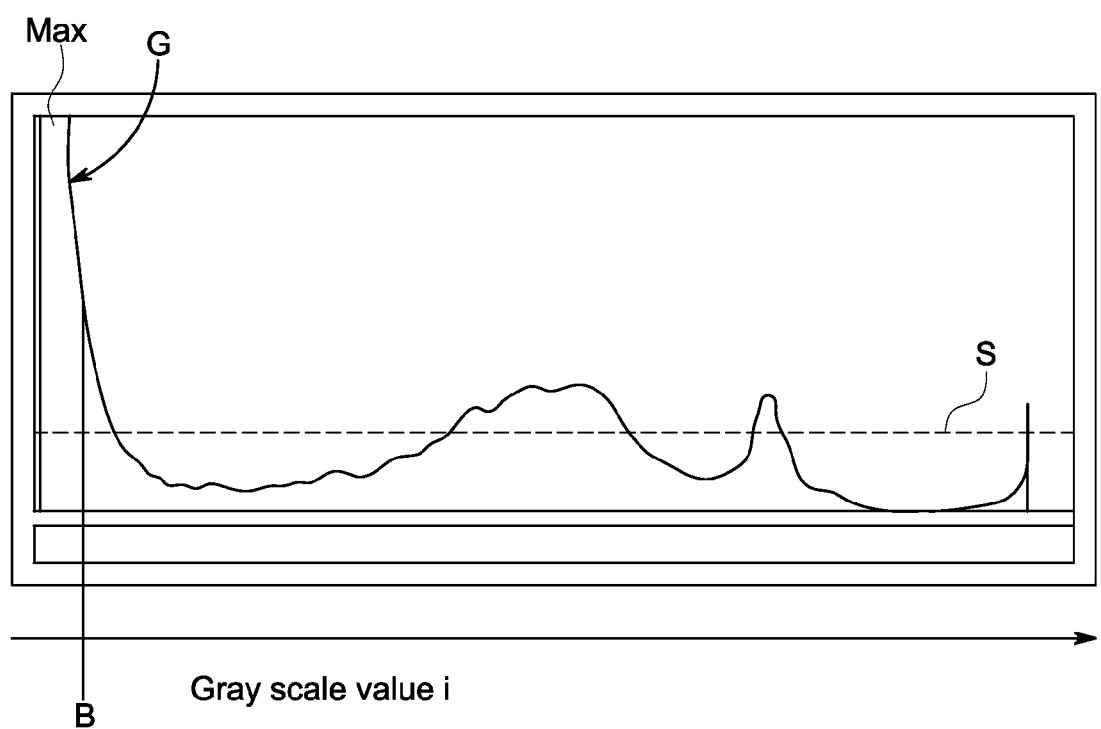

A histogram is calculated from the filtered mammogram 2 in step 103, in which the distribution of the gray scale value of the mammogram 2 is depicted. Such a histogram, which has been derived from the mammogram 2 according to FIG. 3*a*, is depicted in FIG. 3*b*, in which the lowest gray scale values on the left edge of the histogram and the highest gray scale values on the right edge of the histogram are depicted. The index i of the gray scale values is applied horizontally here and the frequency of the gray scale values vertically in the mammogram 2.

In 104 a threshold for the binarization is determined from the histogram. The determination of the threshold occurs, while the histogram is run through in ascending order based on the lowest gray scale value (left-most in the histogram in FIG. 3*b*, until a local maximum max is found, which is above a frequency threshold S. In this connection, the frequency threshold S displays an arbitrarily selected threshold for the selection of a local maximum, which, for example, can be given by $$S = \text{number of pixels of the mammogram}/256.$$

In other words, the frequency threshold indicates, that a gray scale value, in order to qualify for a local maximum, must be represented with a frequency of $1/256$ of the overall number of the pixels in mammogram 2. Based on the local maximum max, the position is sought of the largest declining gradient G of the histogram after the local maximum max, therefore, the steepest point in the trailing edge of the histogram after the local maximum max. The gray scale value at the location of the steepest gradient G, optionally adjusted upwards at an offset amounting, for example, to two gray-scale value levels, is subsequently used as threshold B for the binarization of the mammogram 2.

In step 105, the mammogram 2 is scaled at a factor of $1/5$ and thus reduced in its resolution. The binarization of the mammogram 2 occurs in step 106, in which in the course of the binarization all pixels with a gray scale value above the threshold obtain a pixel value of 0. From the binarized mammogram 2 a contour line now results, which describes the object area 20 of the mammogram, therefore the mamma, however, can be highly frayed and irregular. Therefore, in step 107 the contour line is smoothed morphologically by means of a closing- and/or an opening-operation, in order to trace the contour line in step 108 and to select the largest of the resulting contour lines. Subsequently, in step 109, the determined contour line is scaled back to the original size, in step 110 the contour is smoothed and in step 111 reworked.

The method described is particularly suitable for mammograms 2 with highly noisy background, with which the noise located at the lower end of the histogram is filtered out, while the threshold B is located directly above the hill depicting the noise in the histogram. The contour line resulting from this must be smoothed and reworked, since, as a rule, it is frayed out and nonuniform.

Figure 4:
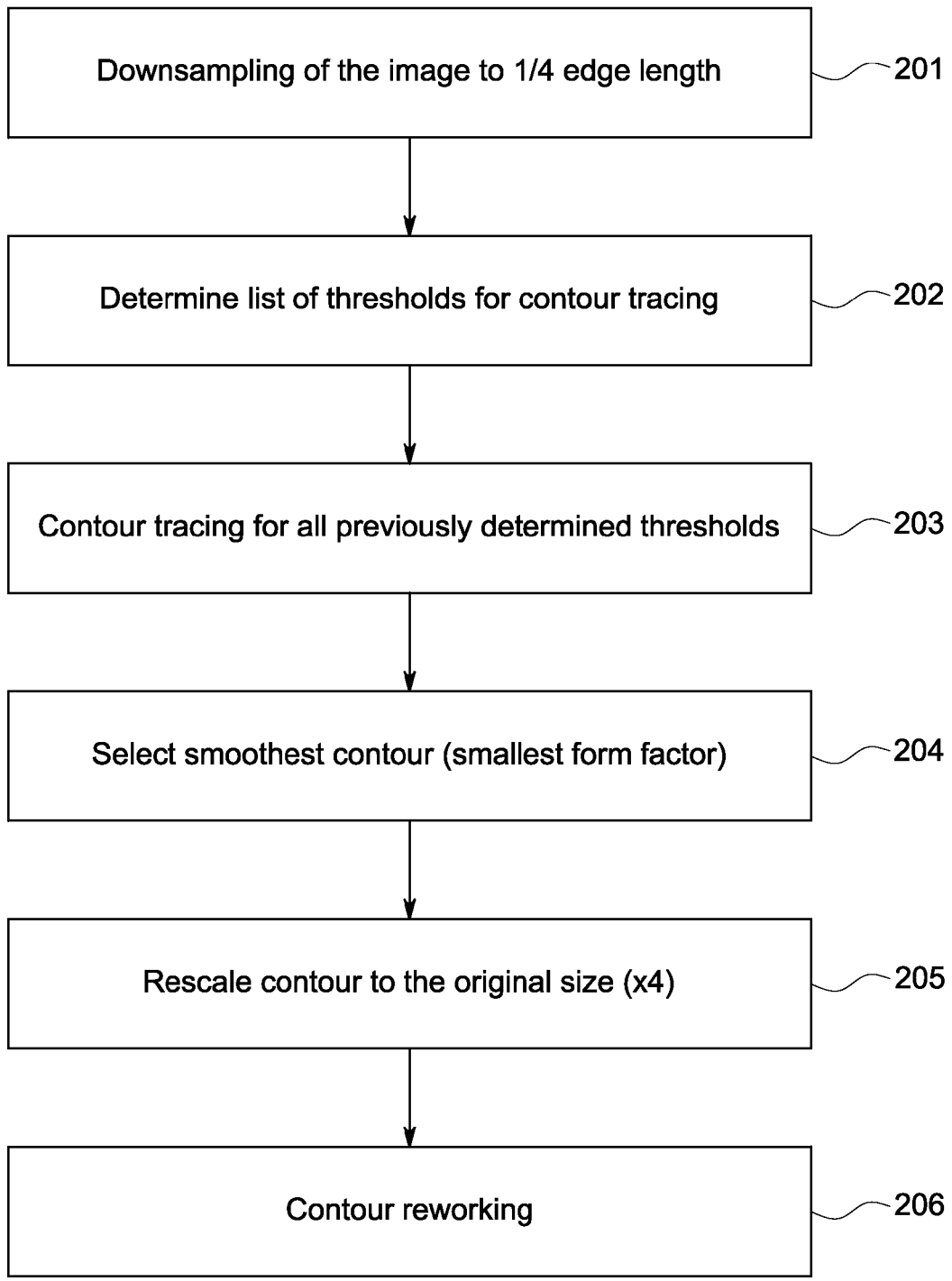
FIG. 4 shows a schematic diagram of a second threshold method for the detection of a contour line of the mammogram.

In FIG. 4, the course of the second threshold method is depicted schematically, which is used particularly for the detection of the contour line in the case of mammograms having little noise, for example, direct-digital mammograms or CR-mammograms.

Figure 5B:
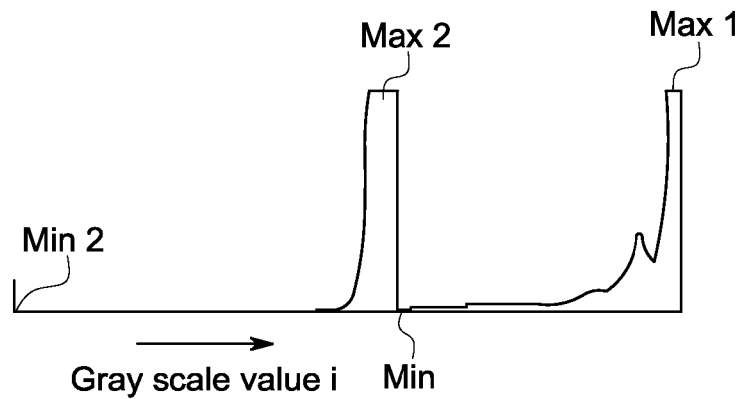
Figure 5C:
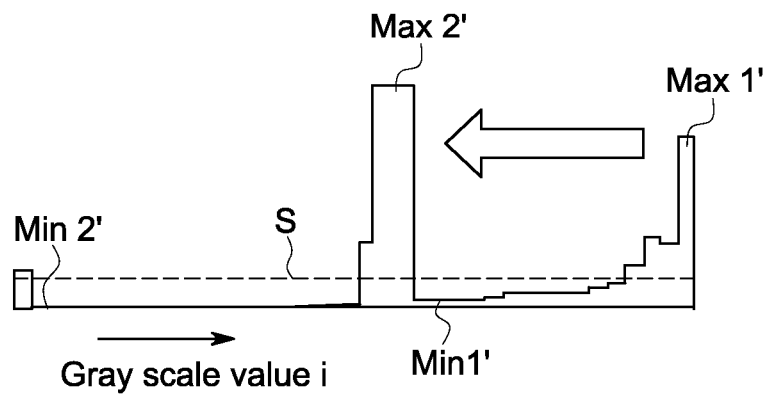
Figure 5D:
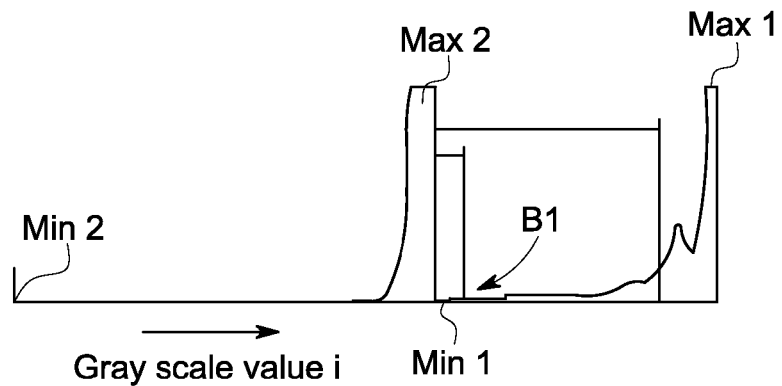

Here, in step 201 the mammogram 2 is at first scaled to ¼ of the edge length and thus the resolution of the mammogram 2 is reduced. Subsequently, in step 202 a list of thresholds for the determination of different contour lines of the mammogram 2 is determined. For this, a histogram is calculated from the mammogram 2, which is depicted in FIG. 5a. Again, here the lowest gray scale value is depicted leftmost and the highest gray scale value rightmost. From this histogram a second histogram is depicted in FIG. 5b, with lower resolution derived, in which the original histogram can contain, for example, 256 gray scale values and the low-resolution histogram 32 gray scale values. For the subdivision of the histogram into mountains and valleys a frequency threshold S is specified, which can be given for example by $$S=(2\times\text{number of pixels})/(5\times\text{number of gray scale values})$$

in which all gray-scale value areas with a histogram value under this threshold are designated as valleys and all gray-scale value areas with a histogram value above the threshold as mountains. The histogram according to FIG. 5b will henceforth, based on the highest gray scale value (rightmost in FIG. 5b), run through from above, until the first mountain with the local maximum max 1' is attained. Based on the first mountain, the following valley is sought and will run through up to the last gray scale value min 1' before the beginning of the next mountain. The gray scale value min 1' directly before the following mountain with the local maximum max 2' is then converted into the gray scale value min 1 in the high-resolution histogram, as depicted in FIG. 5c, and adjusted to the exact transition of the valley to the subsequent mountain. Subsequently, a threshold B1 is derived from the gray scale value min1, while the gray scale value min1 is shifted upwards by ⅛ of the valley width, as shown in FIG. 5c.

After the threshold B1 is determined, in order to find the next threshold, the next mountain with the local maximum max2 is run through, the next valley sought and another threshold determined. These steps are repeated until the whole histogram H is run through and thus all possible thresholds have been acquired.

In step 203, the list of thresholds thus determined for the binarization of the mammogram 2 is used and a contour line is derived in each case from the different binarized mammograms. From the contour lines thus determined the smoothest contour line is selected in step 204, in which in this connection the contour line with the smallest form factor is to be understood by the smoothest contour line. Subsequently, in step 205 the contour is scaled back to the original size and the contour is reworked in step 206.

If necessary, in this case an edge treatment can also be implemented before the determination of the contour line.

The previously described threshold method is used particularly with direct-digital mammograms and CR-mammograms, with which the object to be detected has gray scale values in the upper brightness range. With such mammograms the essential portion of the signals is therefore concentrated in a relatively narrow gray-scale value range, in which the gray scale value drops down relatively rapidly to the background area from the clearly visible, smooth breast edge.

Since the average brightness of the background area is not predictable in this case, a determination of the contour line by means of a fixed, global threshold, according to the first threshold method, is not in this case appropriate. Therefore, all possible thresholds are determined here by analysis of the histogram of the mammogram 2 and different contour lines are derived from these thresholds, from which the smoothest contour line is then selected.

Figure 6A:
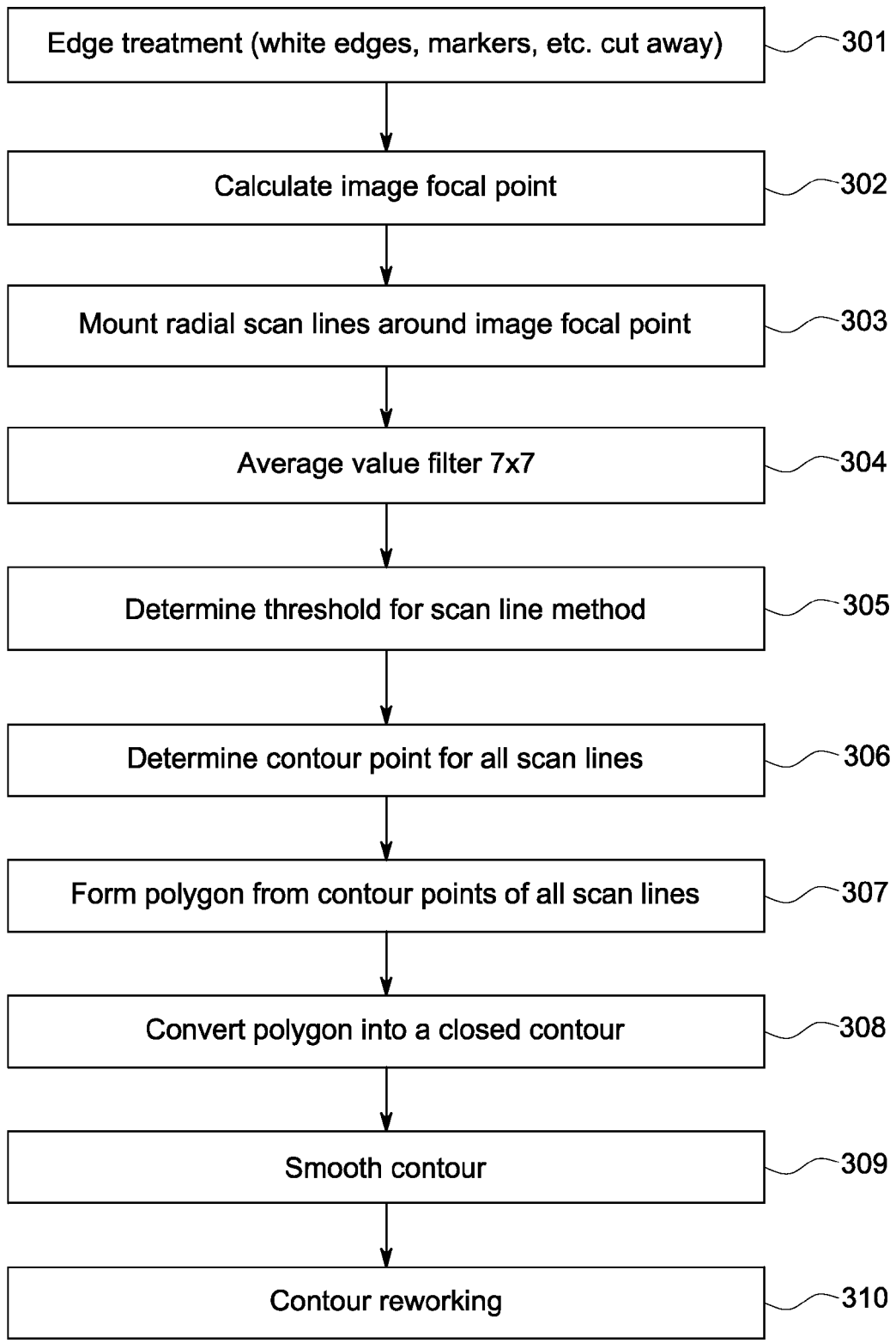
FIG. 6a-6c shows a schematic diagram of a scan line method for the detection of a contour line of the mammogram.
Figure 6B:
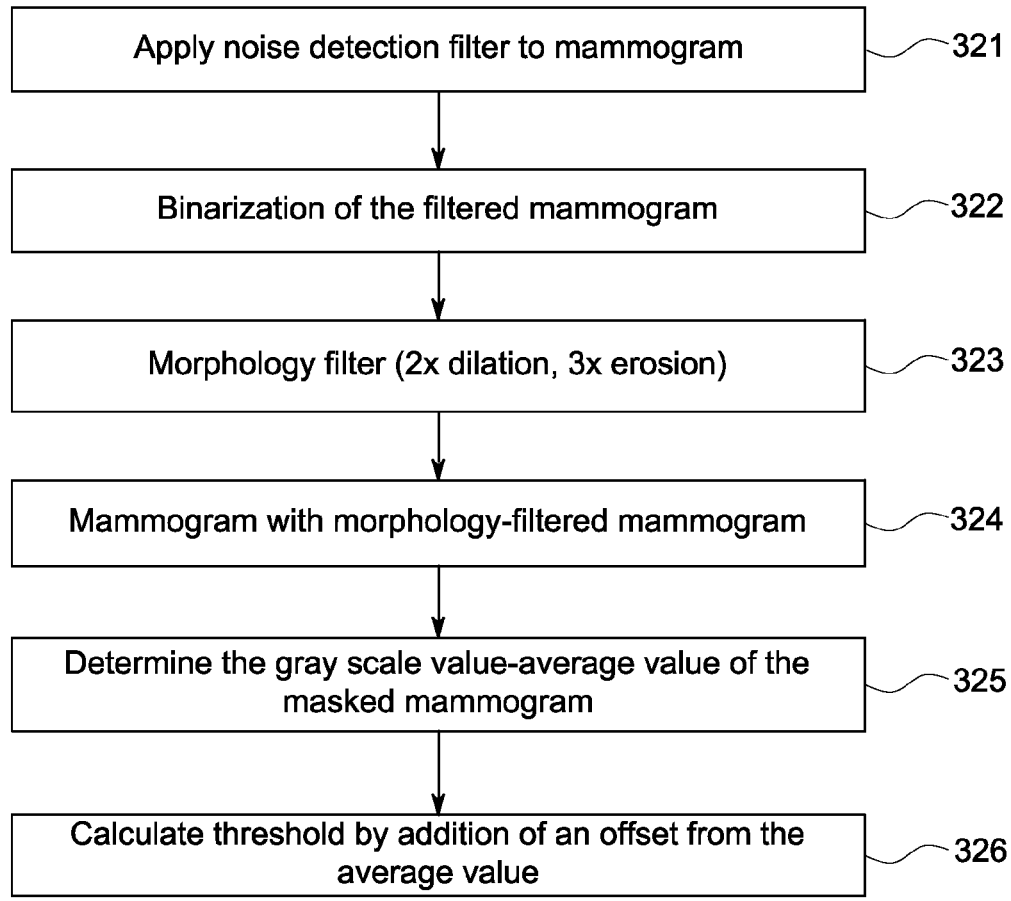
Figure 6C:
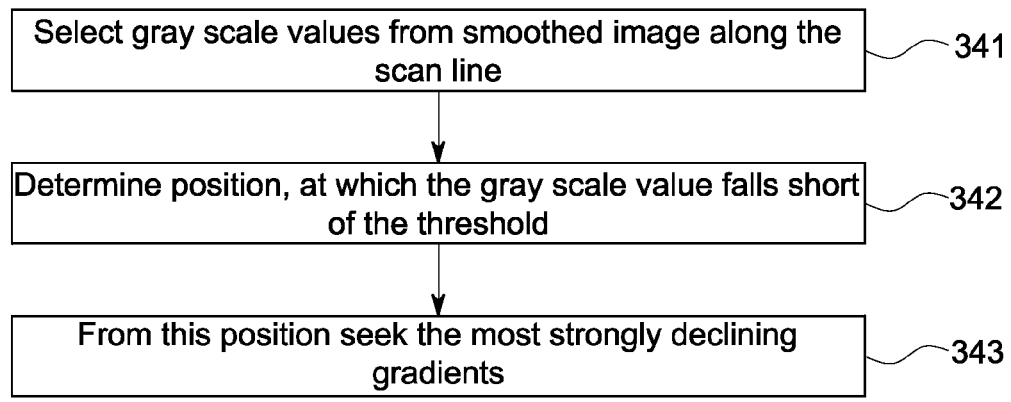

In FIG. 6a-6c ta course of the scan line method for the detection of the contour line is depicted schematically. The scan line method comes into operation particularly if the mammograms 2 have a distinctive gray-scale value progression in the background of the mammogram 2. Initially, the mammogram 2 is subjected here in step 301 to an edge treatment, in which context bright strips and markers are cropped in the edge area of the mammogram 2.

Subsequently, in step 302 the image focal point M of the mammogram 2 forming the mounting point is calculated, in order, as depicted visually in FIG. 7a, to mount radial scan lines R in step 303, which extend across the entire mammogram 2 on the basis of the image focal point M. In step 304, the mammogram 2 is henceforth low-pass filtered by means of an average value filter (7×7) and thus smoothed. In step 305, a threshold for the determination of a starting point Kp' is determined for the scan line method, which is drawn upon for the determination of the contour points Kp of the scan lines R in step 306. The steps necessary for the determination of the threshold and the contour points Kp are subsequently explained in detail.

If the contour points Kp are determined, then a polygon is formed from the contour points Kp of all scan lines in step 307, which is transformed in step 308 into a closed contour line, which is smoothed in step 309 and reworked in step 310.

For the determination of the contour points Kp with the scan line method according to FIG. 6a the location of the steepest gradient in the edge area of the object area is sought for every scan line R. Since the mammograms 2 to be processed by the scan line method are noisy and with large gradients can have afflicted structures also in the interior of the object area 20, the scan lines R are not complete here, but rather in each case on the basis of a starting point Kp' only run through outwards, in which the starting point Kp' must be located in each case within the object area, thus the mamma, and is determined by means of the threshold determined in step 305. Through use of the starting points Kp' the scan line method is robust and reliable, while in particular the steepest gradient is sought for only in the area, in which the contour line of the object area 20 is potentially located.

Figure 7B:
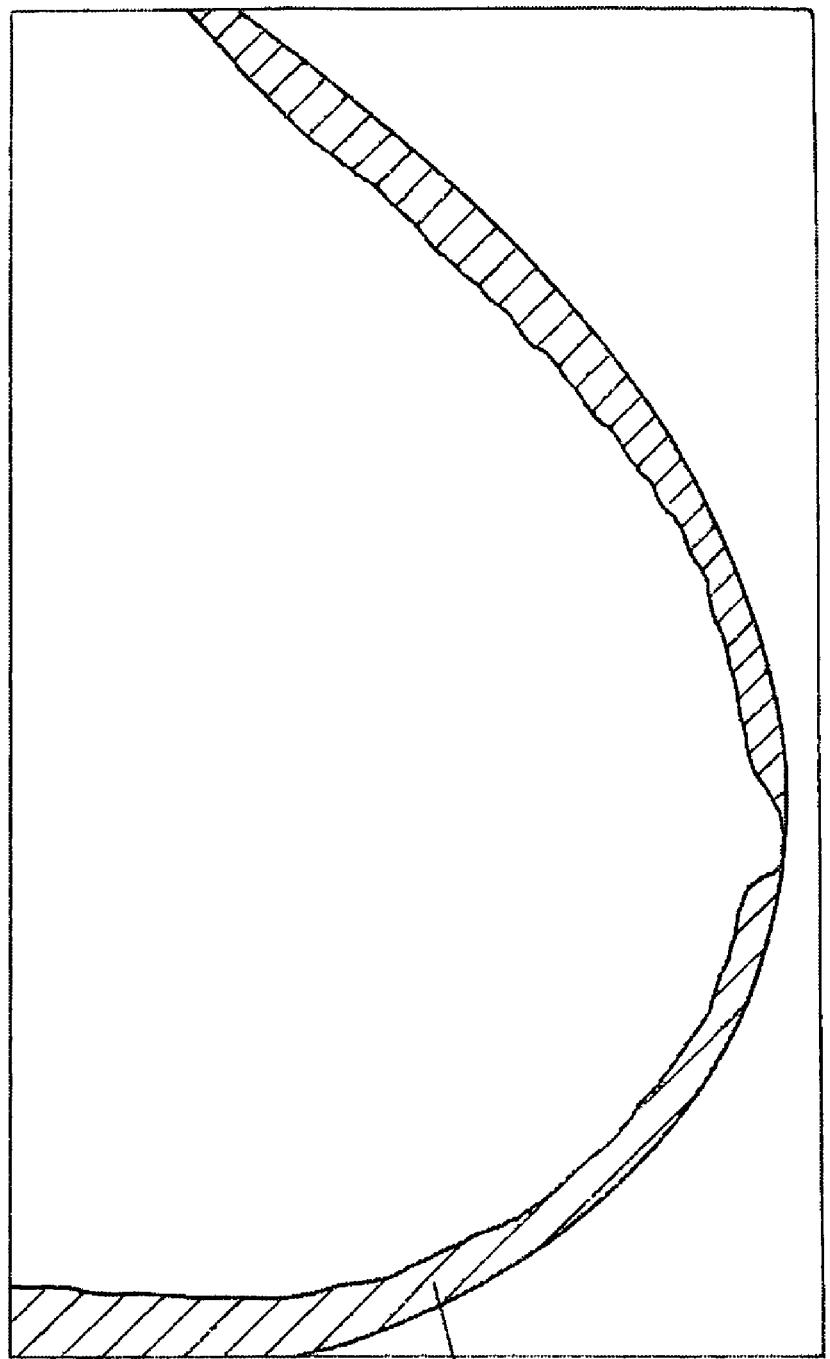
FIG. 7b shows a diagram of the mask for the determination of the threshold in step 305 according to Fig. A.

For the determination of the threshold for the designation of the starting points Kp', initially a noise detection filter is thereby applied to the mammogram 2 in step 305, as depicted schematically in FIG. 6b (step 321). Subsequently, the mammogram 2 filtered in this way is binarized (step 322), a morphology filter is applied to the binarized mammogram 2 (step 323, in which, for example, a double dilation operation and a triple erosion operation can be implemented for the standardization and smoothing of the binarized mammogram 2) and thus a mask 22 depicted in FIG. 7b is generated, by means of which the original mammogram 2 is masked (step 324). With the masking of the original mammogram 2 by means of the mask 22 only the gray scale values then remain in the areas depicted obscurely in FIG. 7b, from which the average value is then formed in step 325 and the threshold is determined in step 326, while an offset is added to the average value. Consequently, the threshold thus determined depicts the average value of the gray scale values in the edge area of the mamma, adjusted upwards by an offset, and establishes the starting points Kp', which correspond to the points along the scan lines R, at which the gray scale values of the scan lines fall short of the threshold on the basis of the image focal point M for the first time.

By means of the threshold determined by the method according to FIG. 6b, starting points Kp' are thus determined, from which on the basis of the scan lines R they are run through outwards, in order to determine the position of the steepest gradient and thus the contour points Kp. Through use of the starting points Kp' it is guaranteed, that the steepest gradients are not sought in the interior of the object area 20, but rather exclusively in the edge area of the object area 20. With the determination of the starting points Kp', that the mammogram 2 to be examined is noisy precisely in the edge area of the object area 20 is utilized here, so that the edge area can be determined by means of a noise detection filter (see step 321) and thus the area, in which the contour line is located, can be filtered out, in order to specifically seek for the contour points Kp in this area.

The determination of the steepest gradient is schematically depicted in detail in FIG. 6c. For the determination of the contour point Kp of scan line R initially the gray scale values of the mammogram 2 are read out along the scan line (step 341). Then the position is determined, at which the gray scale values fall short of the threshold determined in Step 305 and which depict the starting point Kp', (step 342) and subsequently from this starting point Kp' the position of the most sharply declining gradient is sought (step 343), which indicates the contour point Kp on the scan line R.

The previously described different method for the detection of the contour line, as indicated, for example, in FIG. 2, can be combined with a method for the edge treatment of the mammogram 2 before the determination of the actual contour line. Such an edge treatment is required, if bright strips or objects in the form of markers or suchlike are located in the edge areas of the mammogram 2, which with the detection of the contour line are troublesome and can lead to erroneous results.

Figure 8:
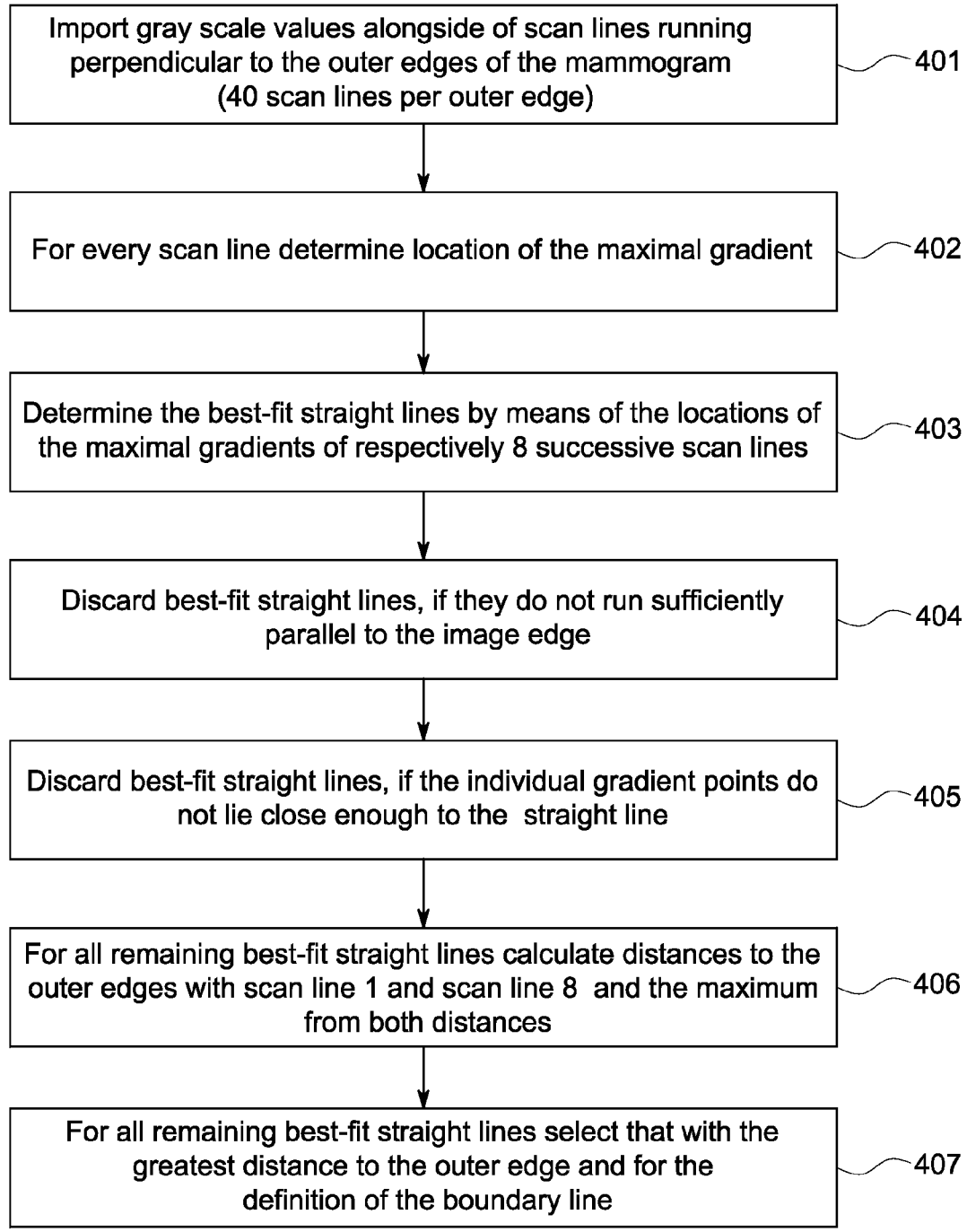
FIG. 8 shows a schematic diagram of the method for the edge treatment.
Figure 9:
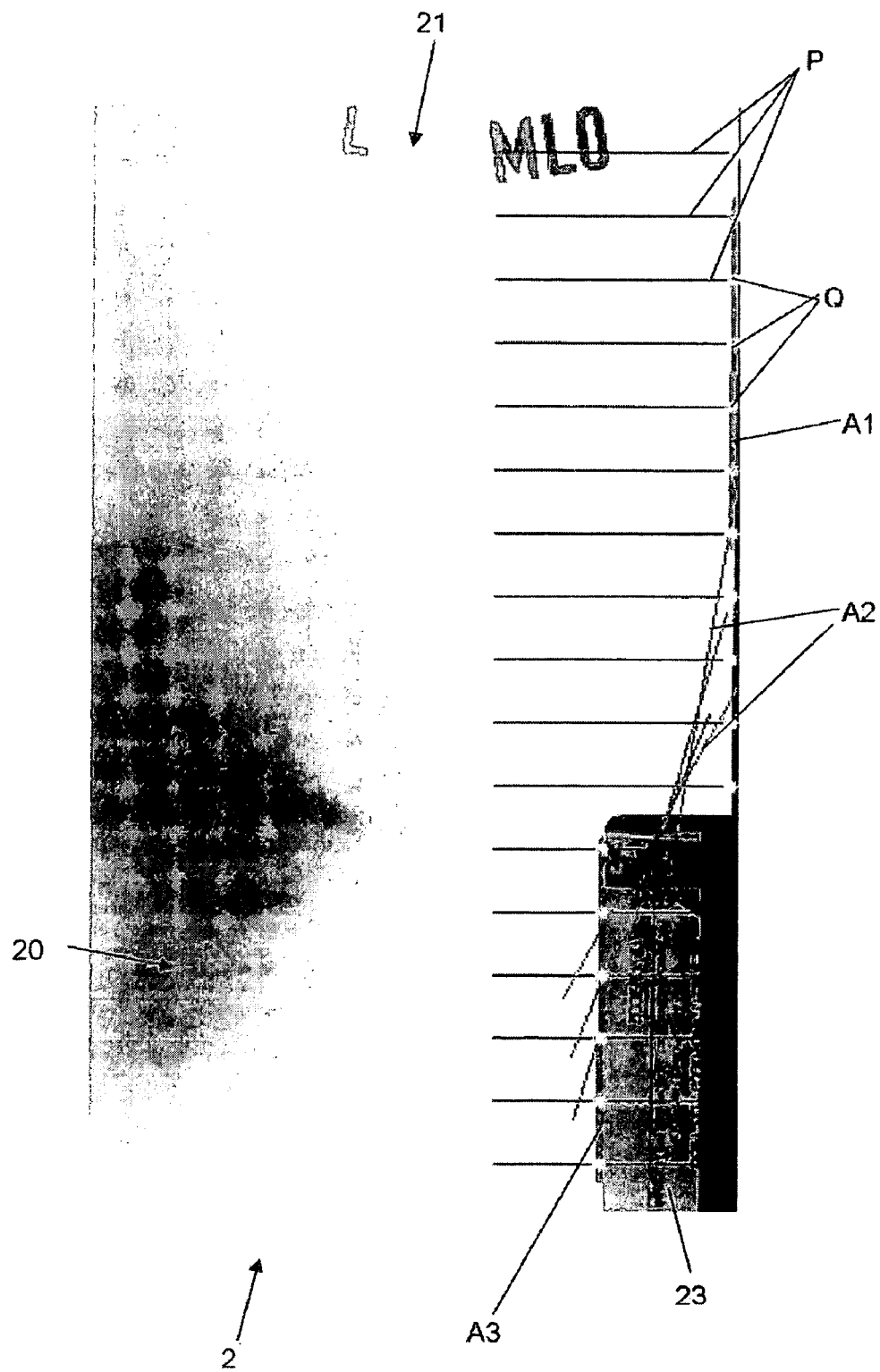
FIG. 9 shows a mammogram with scan lines located in the mammogram for the edge treatment of the mammogram.

Such a method for the edge treatment is depicted schematically in FIG. 8 and illustrated in FIG. 9. The mammogram 2 depicted in FIG. 9 contains an object 23 in the form of a marking field, which, for example, can indicate the patient data and photograph information. The object 23, as well as the object area 20, is coded by gray scale values, can have large gradients on its edges and thus can disturb the analysis of the mammogram 2. In the context of the edge treatment, edge areas of the mammogram 2 with troublesome objects 23 are thus removed.

In the context of the edge treatment the objects 23 must thereby be detected and then eliminated from the mammogram 2. Initially, for this, according to the method depicted in FIG. 8, in step 401 scan lines P are located in the mammogram 2, which run perpendicular to an outer edge to be examined of the mammogram 2. For example, here 40 scan lines per outer edge are used, in order to record objects in the edge area of the mammogram 2 with an adequate resolution. In step 402, the location Q of the maximal gradient is determined for every scan line. On the basis of the locations Q of the maximal gradients on the individual scan lines P, best-fit straight lines A1, A2, A3 are then determined in step 403, in which a straight line is determined for the determination of the best-fit straight lines A1, A2, A3 respectively for the locations Q of eight successive scan lines P, which best approximates the locations Q of the eight scan lines P considered. In steps 404 and 405 the best-fit straight lines A1, A2, A3 thus determined are discarded, if they do not run sufficiently parallel to the outer edges of the mammogram 2 (step 404) or the locations Q appertaining to the best-fit straight lines are not close enough to the best-fit straight lines A1, A2, A3. In step 404, it is thus assured, that only best-fit straight lines will be used, which essentially run parallel to the image edge. In step 405, it is additionally assured, that only such best-fit straight lines are used, whose associated locations Q do not scatter too far around the best-fit straight lines. For the steps 404, 405 an appropriate error measurement can be defined here, which defines a tolerance threshold, in which the best-fit straight lines are discarded with the exceeding of the tolerance threshold.

Applied to the best-fit straight lines A1, A2, A3 in FIG. 9, this means in detail, that the best-fit straight lines A1, A3 are retained, since they both run parallel to the image edge as well as precisely picture the locations Q belonging to the best-fit straight lines A1, A3. The best-fit straight lines A3, on the other hand, which neither run parallel to the outer edge of the mammogram 2, nor adequately picture the locations Q, which they should approximate, are discarded and not considered any further.

In step 406, the distances of the locations Q to the outer edges with the scan line 1 and the scan line 8 of the respective best-fit straight lines A1, A3 are then calculated for all non-discarded best-fit straight lines A1, A3, in order to select the maximum from the two distances. That with the largest distance to the outer edge of the mammogram is selected from all remaining best-fit straight lines A1, A3 and is consulted for the definition of the boundary line (step 406), in which the boundary line runs parallel to the outer edge of the mammogram 2 and is defined by the maximum distance of the selected best-fit straight line. The mammogram 2 is then cropped along the boundary line, so that all objects 23 in the edge area of the mammogram 2 beyond the boundary line are removed.

For the case depicted in FIG. 9 that means, that the mammogram 2 is cropped perpendicularly upwards along the best-fit straight line A3 and its vertical extension and thus the edge area beyond the boundary line defined by the best-fit straight line A3 and its vertical extension is removed and is not considered any further with the analysis of the mammogram 2.

Furthermore, the device 1, as indicated in FIG. 1, can additionally have a means for the implementation of a contour reworking 16. The contour reworking serves the purpose of reworking the contour line determined by means of the threshold method according to FIG. 2 or FIG. 4 or the scan line method according to FIG. 6a-6c, so that it indicates precisely the object area to be detected of a mammogram 2.

Figure 10:
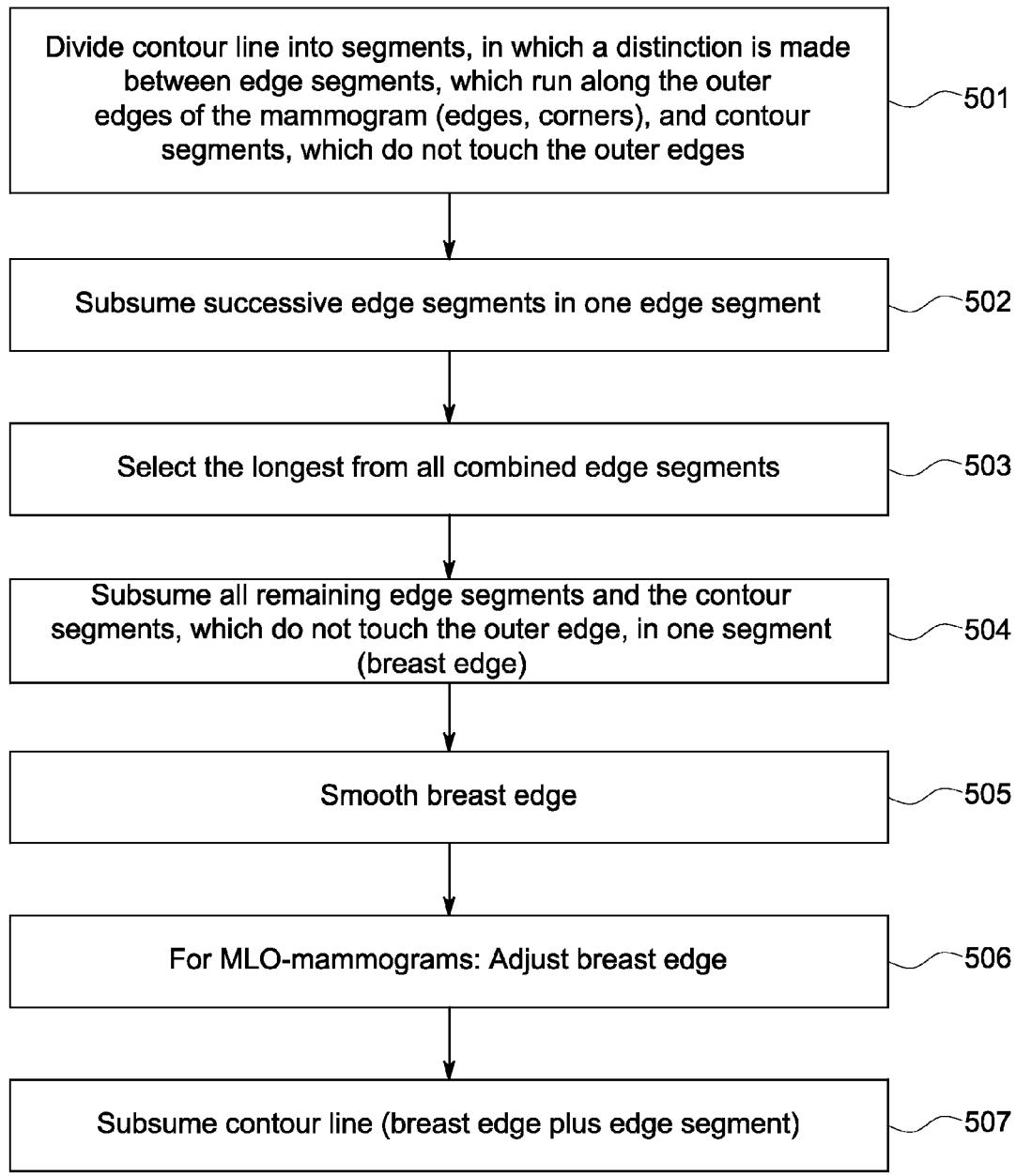
FIG. 10 shows a schematic diagram of the method for the contour reworking.

In FIG. 10, a mammogram 2 is depicted with a contour line K, which consists of contour segments Y1, Y2, Y3, Y4 and the edge segments X1, X2, X3 and depicts in part incompletely the mamma to be pictured in object area 20. In particular, with the mammogram 2 according to FIG. 10, the mamma is partially cropped in the lower area (along the edge segment X3) and, furthermore, the contour segment Y4 is defective, if the mamma depicted in the mammogram 2 should be segmented and exclusively the contour line surrounding the mamma should be determined, however, the skin fold reproduced by the contour segment Y4 should be neglected. By means of the method for the contour reworking it is then made possible to adjust the contour line K, so that the object area is displayed in the desired manner.

Figure 11:
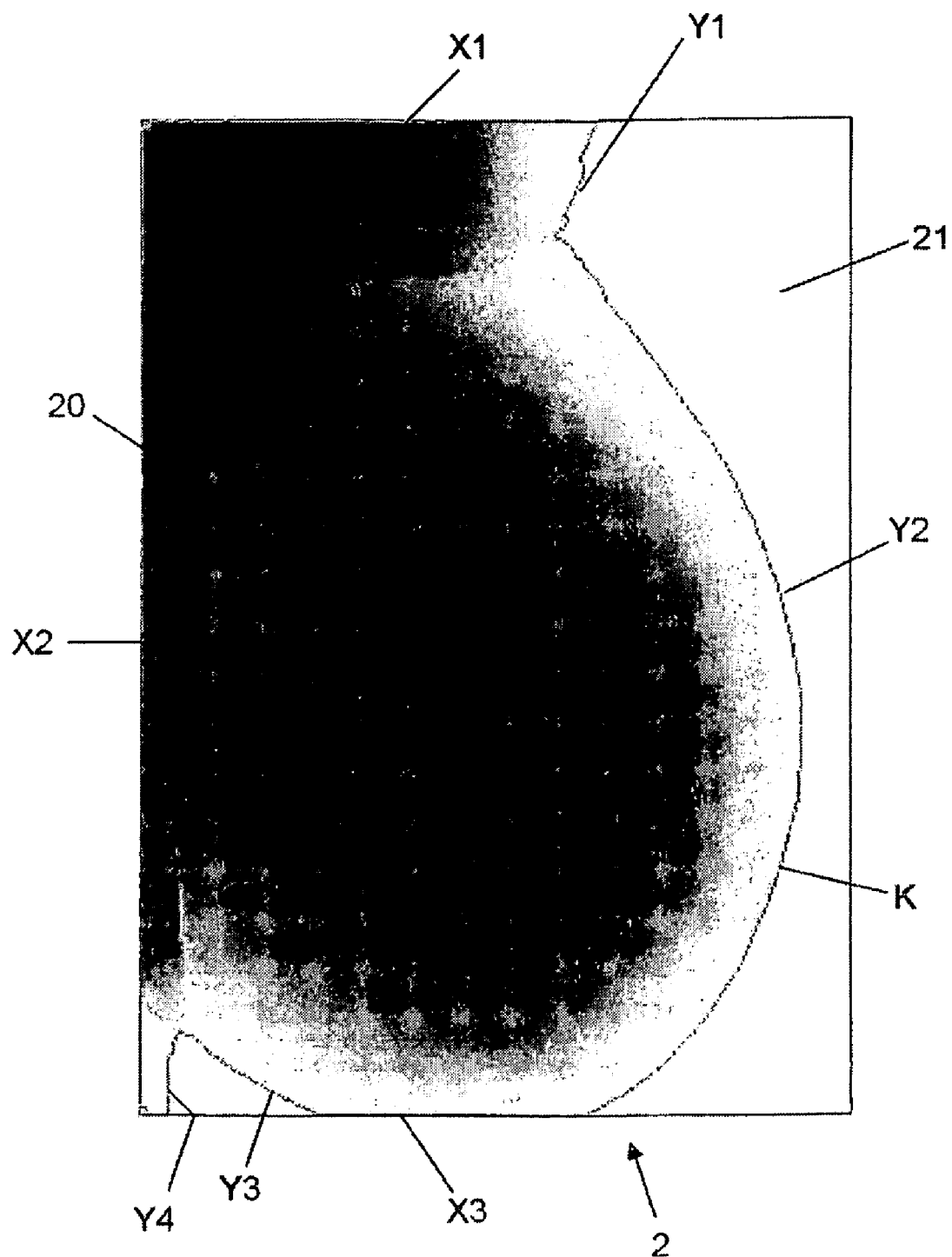
FIG. 11 shows a mammogram with a determined contour line.

The method for the contour reworking is depicted schematically in FIG. 11. Initially, the contour line is divided here in step 501 into segments, in which a distinction is made between edge segments X1, X2, X3, which run along the outer edge of the mammogram 2 (edges, corners), and contour segments Y1, Y2, Y3, Y4, which do not touch the outer edges or only do so in one point. In step 502, successive edge segments X1, X2 are subsumed in a combined edge segment. Subsequently, in step 503 the longest edge segment X1, X2 is selected from all combined edge segments, and in step 504 all remaining edge segments X3 and the contour segments Y1, Y2, Y3, Y4 are combined in one segment. This produces a breast edge, which displays the contour of the mamma in the mammogram 2. The breast edge is thereupon smoothed in step 505 and adjusted in step 506.

Subsequently the contour line K is combined in step 507 from the breast edge and the edge segments X1, X2, so that a complete contour line K results surrounding the object area 20 with the mamma depicted in mammogram 2.

For the adjustment of the breast edge in step 506, for one thing, the contour line in the area between the contour segments Y2 and Y3 is replenished, so that a realistic contour line results. Furthermore, it can be advantageous to remove the contour segment Y4 from the contour line, since this does not indicate the breast edge, but rather a skin fold, which does not immediately belong to the mamma depicted in the mammogram 2.

Figure 12A:
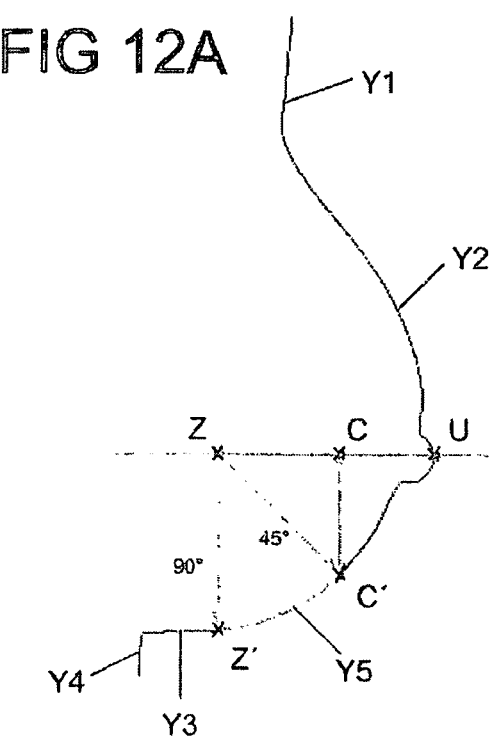
FIG. 12a, 12b shows outlines for the explanation of the method for the contour reworking.
Figure 12B:
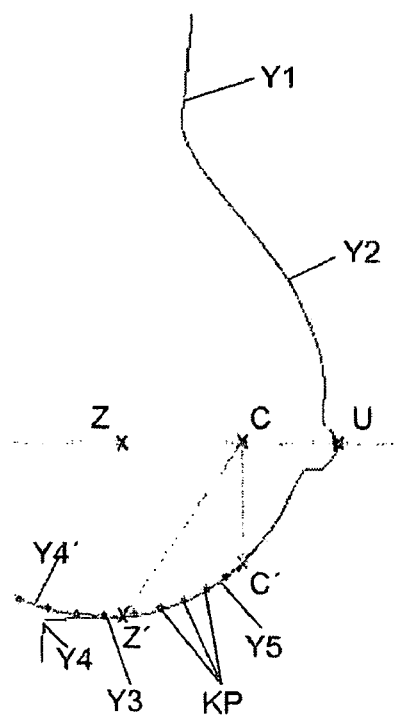

The principle method for the adjustment of the breast edge in step 506 according to FIG. 11 is illustrated by means of FIGS. 12a and 12b. In order to replenish and adjust the breast edge between the contour segment Y2 and Y3, initially the point of the breast edge is selected, which lies farthermost right in the mammogram 2, corresponding to the point U in FIG. 12a. Subsequently, an auxiliary point Z is determined, whose coordinates correspond in the horizontal and vertical direction xZ=xU/3, yZ=yU, in which xZ and yZ indicate the coordinates of the auxiliary point Z and xU and yU indicate the coordinates of the point U in the horizontal and vertical direction in mammogram 2. Based on the auxiliary point Z, a starting point C' and an end point Z' is sought on the breast edge, while for the starting point C' a line is drawn at an angle of 45° to the section spanned by the points Z, U to the breast edge and for the end point C' the perpendicular line is drawn in the direction of the breast edge, in which the crossing point with the breast edge produces the points C', Z' (see FIG. 12a). Now a further auxiliary point C is determined, while the point C located perpendicular via the point C' to the section formed by the points Z, U is sought. Subsequently, all contour points Kp between the starting point C' and the end point Z' are determined, and a curve is adjusted at this contour point, using, for example, a curve of the following form:

$$R = A(\phi - \phi O)^2 + B,$$

in which in the context of the adjustment the parameters A, B and $\phi O$ are determined and R and $\phi$ depict the coordinates of the contour point Kp in polar coordinates notation at the point C. In order to adjust the course of the contour line K, henceforth, the curve course, as depicted in FIG. 12b is extrapolated, so that the curve is continued to the left beyond the end point Z'. Contour points, which lie outside of the thus determined curve, are then discarded, and the extrapolated curve turns into a new contour segment Y4'.

By means of the method for the contour reworking both areas of the breast edge can be closed as well as contour segments, which are not part of the object area to be recorded, can be excluded, so that a contour line is provided as a result, which pictures the object contained in the mammogram 2 in the best possible way.

The previously described methods for the detection of the contour line run completely automatically and determine a contour line from an inputted mammogram 2, in which different methods come into operation depending on the type of the mammogram 2 and in this way different mammograms 2, differing with regard to their image characteristic can be processed. Independent of the type of mammogram 2 a contour line or a masking image determined on the basis of the contour line is then provided to the operator as output.

After the object area contained in a mammogram is detected and segmented, i.e., the contour line surrounding the object area has been determined, the mammogram can be further processed. For one thing, the detection of the contour line henceforth as described at the outset makes possible the automatic adjustment, scaling and positioning of the mamma contained in the mammogram just as depicted in FIGS. 13a and 13b.

Figure 14A:
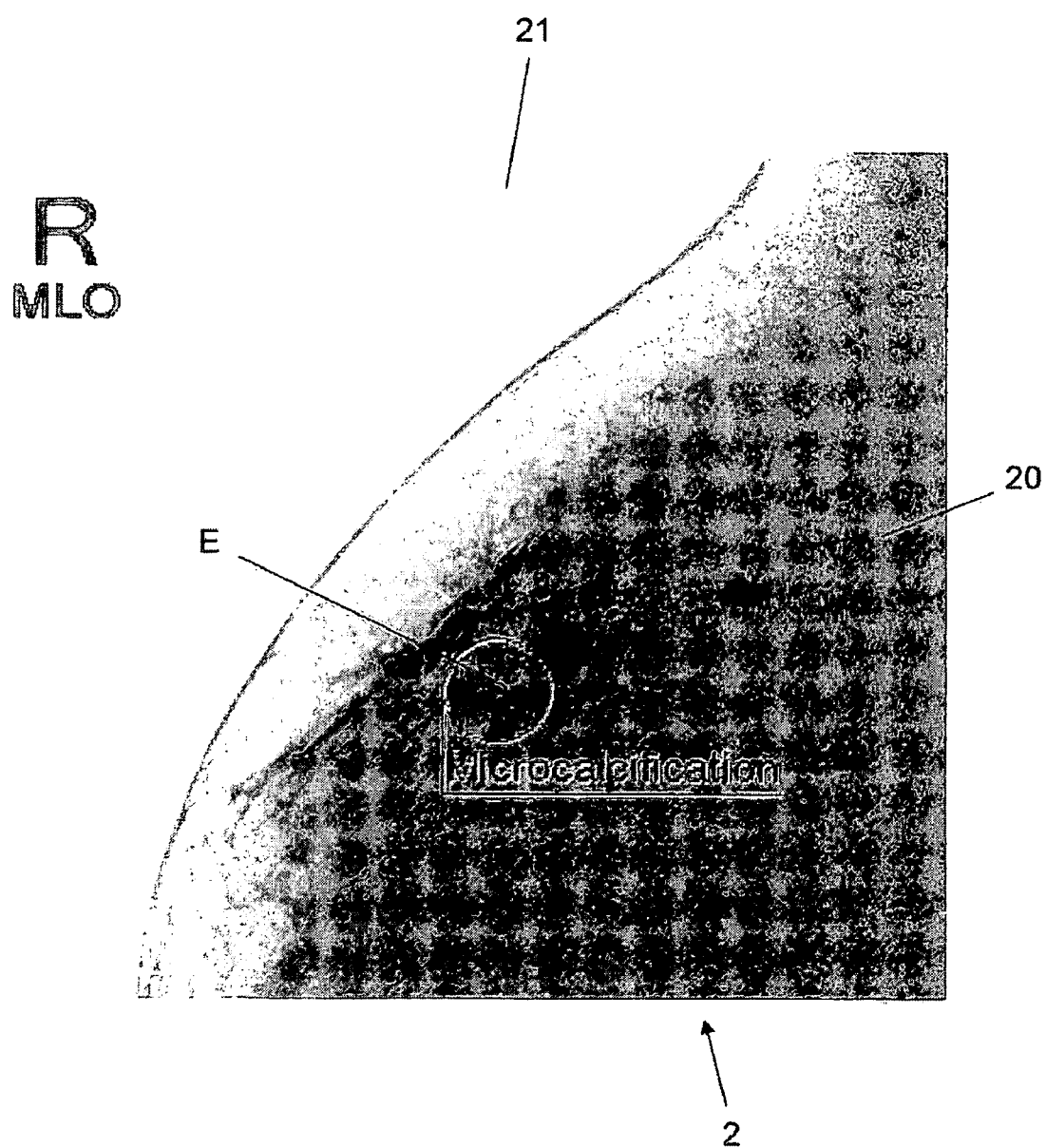
FIG. 14a shows detail of a mammogram with an input of a finding inserted into the mammogram.
Figure 14B:
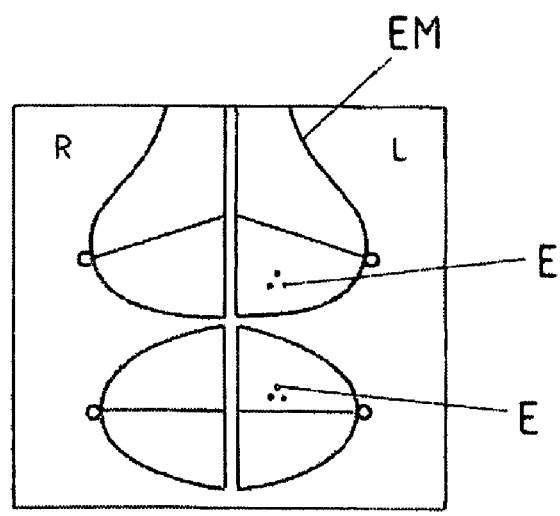
FIG. 14b, 14c shows standardized finding masks for the display of an inputted finding.
Figure 14C:
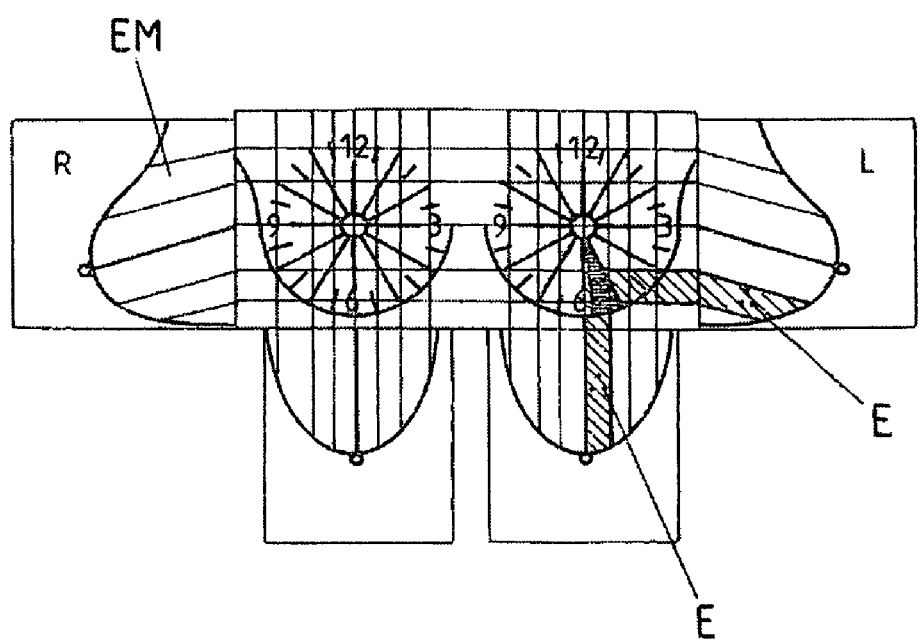

Based on the detection of the contour line and the automatic positioning and scaling of one or several mammograms, the findings input of a doctor can also be supported, while an interactive findings input is made possible directly in a mammogram, just as depicted in FIG. 14a-14c. Conventionally, evaluation equipment known from the prior art, for example, in the form of a workstation, has a film viewer, particularly a PACS-viewer (PACS: Picture Archiving and Communication System) and a findings input window (RI-Client, RIS: Radiology Information System). With evaluation equipment belonging to the prior art the doctor here considers the mammogram 2 in the film viewer and must subsequently switch into the findings input window, in order to input his findings there, in which the findings input can be conducted by manual text input, dictation with recording or voice recognition, but basically occurs in the separate input window.

Particularly with regular screening-examinations a problem results that a doctor must evaluate a large number of mammograms in a short period of time. With conventional findings equipment it is thereby disadvantageous, that the doctor is diverted from the image with the findings input, since the findings input does not directly occur in the mammogram 2, thereby the effective time is reduced, which the doctor can employ in the visual examination and diagnosis of the mammogram 2, and the change between the findings input and the examination leads to an increased error-proneness with the diagnosis due to increased concentration requirements. Furthermore, transmission errors can occur, which is attributable to the fact that the doctor must document the location of the findings in the mammogram 2 as essential information with the findings input.

While during mammography mammograms 2 are automatically analyzed by means of a computer-assisted analysis, the findings input can be considerably assisted and simplified by a doctor. For this, the device has a findings input device 18, which processes a finding inputted by a doctor in the manner depicted in FIG. 14a-14c.

With the examination of one or several mammograms 2 generated in the course of the examination, a doctor, as shown in FIG. 14a, inputs a finding E directly into the mammogram 2, in which a selection box with predefined findings inputs (for example the possible inputs of "micro-calcification," "compression focus," "asymmetry" or such like) can be provided. From the mammogram 2 the contour line of the mamma depicted in mammogram 2 is now determined. While the contour line is compared with a findings mask EM, the coordinates of the inputted finding E, as depicted in FIGS. 14B and 14c, are transferred into the findings mask EM, in which the location of the finding E in the findings mask EM is determined through the comparison of the mamma described by the contour line with the standardized findings mask EM, transferred in this manner into the findings mask EM and displayed in the findings mask EM. The standardized findings mask EM can here, for example, indicate the standard contour of an average mamma and serve the doctor for the visualization and illustration of the finding.

In this connection, a finding E in a mediolateral oblique mammogram 2 is automatically transferred into a mediolateral oblique findings mask EM (see upper half of the picture in FIG. 14b), whereas a finding E in a craniocaudal mammogram 2 is accordingly indicated in a craniocaudal findings mask EM.

Moreover, the inputted finding is automatically documented in a so-called time-of-day model, with which, similar to flying, the location of the finding in the findings mask EM is indicated by a time, in which the time indicates a direction on the basis of a central point of the mamma, in which the finding E is located in the mamma. The coordinates of the finding E are here converted into the time-of-day model and displayed, as depicted in FIG. 14c. With the example depicted in FIG. 14c, the finding E inputted by the doctor is thus automatically converted into the display "micro-calcification with 5:30 o'clock" and subsequently saved as a structured text finding.

The idea underlying the invention is not limited to the previously described execution example. In particular, the described method can also be applied analogically in order to automatically determine, process and document the density of the breast parenchyma in a mammogram. For this a segmentation of the breast area is carried out, in order to determine the dense breast area, and based on the characteristics like contrast and surface of the breast area, to classify according to pre-determined criteria (for example, defined by the American College of Radiology) and to transfer into a structured findings input.

Moreover, the described method can also be used, in order to automatically detect and document the quality of a mammogram and its positioning. Also, for this a segmentation of the contour line is implemented, in order to determine, for example, mamilla, muscle and angle of the lower skin fold.

On the basis of the pre-determined (for example, defined by the "European Guidelines for Mammography Screening") criteria a quality assessment of the mammogram is then calculated from these parameters and transferred into the structured findings input.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

The invention claimed is:

1. A method for analyzing mammograms comprising:
    determining, via a processing unit, a contour line that divides an object area from a background area of a mammogram;
    using the contour line to position the mammogram relative to another mammogram and to scale the mammogram to reduce the background area relative to the object area;
    implementing an edge treatment to determine lateral boundary lines of the mammogram;
    reading gray scale values of the mammogram along scan lines positioned perpendicular to an outer edge of the mammogram;
    determining in each case a position of a steepest gradient of the gray scale values along the scan lines; and
    determining the lateral boundary line of the mammogram from the positions of the steepest gradients.

2. A method for analyzing mammograms, the method comprising:
    calculating, via a processing unit, a histogram of a mammogram;
    determining from the histogram at least one threshold and using the at least one threshold for the binarization of the mammogram;
    binarizing the mammogram based on the at least one threshold;
    determining a contour line from the binarized mammogram that divides an object area from a background area of the mammogram; and
    using the contour line to position the mammogram relative to another mammogram and to scale the mammogram to reduce the background area relative to the object area.

3. The method of claim 2, wherein determining the at least one threshold further comprises:
    running the histogram through in ascending order based on a lowest gray scale value;
    determining a local maximum of the histogram;
    determining a steepest gradient of a trailing edge of the histogram according to a local maximum;
    determining based on the steepest gradient a threshold; and
    employing the threshold for the binarization of the mammogram.

4. The method of claim 2, wherein determining the at least one threshold further comprises:
    running the histogram through in descending order based on a highest gray scale value;
    determining a local maximum of the histogram;
    determining a valley of the histogram following the local maximum; and
    determining a threshold based on the valley.

5. The method of claim 4, wherein the steps of determining a local maximum of the histogram, determining a valley of the histogram following the local maximum, and determining a threshold based on the valley are repeated until the histogram is run through.

6. The method of claim 4, wherein different thresholds are determined, which are used respectively for the binarization of the mammogram and the determination of different contour lines.

7. A method for analyzing mammograms comprising:
    mounting, via a processing unit, radial scan lines via a mounting point of a mammogram;
    reading the mammogram out along the scan lines;
    determining a gradient of the mammogram along the scan lines;
    determining based on the gradient of the mammogram a contour line along each of the scan lines for each scan line respectively; and
    further determining the contour line along each of the scan lines based on contour points of the individual scan lines;

selecting at least one contour line that divides an object area from a background area of a mammogram; and using the at least one contour line to position the mammogram relative to another mammogram and to scale the mammogram to reduce the background area relative to the object area.

8. The method of claim 7, wherein the mounting point corresponds to an image focal point of the mammogram.

9. The method of claim 1, further comprising:

determining an image focal point of the mammogram; and
positioning the mammogram so the contour line intersects the image focal point.

10. The method of claim 1, further comprising:

determining a rectangle surrounding the object area; and
scaling the mammogram using the rectangle.

11. The method of claim 10, further comprising:

determining a second rectangle surrounding a second object area of the another mammogram; and determining from the rectangle and the second rectangle a scaling factor to be applied to each of the mammograms.

12. The method of claim 1, wherein the determining a contour line further comprises using at least one threshold for binarization of the mammogram.

13. The method of claim 1, wherein the determining a contour line further comprises:

determining a gradient of the mammogram along different scan lines.

14. The method of claim 1, further comprising:

outputting the object area as a masking image determined using the contour line.

15. The method of claim 1, further comprising:

outputting the object area as a form of the contour line.

* * * * *